United States Patent
Hanada et al.

(10) Patent No.: US 9,394,462 B2
(45) Date of Patent: *Jul. 19, 2016

(54) POLYSILOXANE-MODIFIED POLYHYDROXY POLYURETHANE RESIN, METHOD FOR PRODUCING SAME, HEAT-SENSITIVE RECORDING MATERIAL USING THE RESIN, IMITATION LEATHER, THERMOPLASTIC POLYOLEFIN RESIN SKIN MATERIAL, MATERIAL FOR WEATHER STRIP, AND WEATHER STRIP

(71) Applicants: DAINICHISEIKA COLOR & CHEMICALS MFG. CO., LTD., Tokyo (JP); UKIMA CHEMICALS & COLOR MFG. CO., LTD., Tokyo (JP)

(72) Inventors: Kazuyuki Hanada, Tokyo (JP); Kazuya Kimura, Tokyo (JP); Kenichi Takahashi, Tokyo (JP); Osamu Kawakami, Tokyo (JP); Manabu Uruno, Tokyo (JP)

(73) Assignees: DAINICHISEIKA COLOR & CHEMICALS MFG. CO., LTD, Tokyo (JP); UKIMA CHEMICALS & COLOR MFG. CO., LTD., Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 14/467,620

(22) Filed: Aug. 25, 2014

(65) Prior Publication Data

US 2014/0364027 A1    Dec. 11, 2014

Related U.S. Application Data

(63) Continuation of application No. 13/510,576, filed as application No. PCT/JP2010/071037 on Nov. 25, 2010, now Pat. No. 8,951,933.

(51) Int. Cl.

| | | |
|---|---|---|
| *C08G 18/58* | (2006.01) | |
| *C08G 18/61* | (2006.01) | |
| *C08G 18/77* | (2006.01) | |
| *C08G 71/04* | (2006.01) | |
| *D06N 3/14* | (2006.01) | |
| *C08L 83/04* | (2006.01) | |
| *B60R 13/02* | (2006.01) | |
| *B32B 27/40* | (2006.01) | |
| *C09D 175/04* | (2006.01) | |
| *B32B 27/12* | (2006.01) | |
| *B32B 27/28* | (2006.01) | |
| *B41M 5/44* | (2006.01) | |
| *B60J 10/00* | (2016.01) | |
| *C09D 183/04* | (2006.01) | |
| *D06N 3/00* | (2006.01) | |
| *D06N 3/12* | (2006.01) | |

(52) U.S. Cl.
CPC .............. *C09D 175/04* (2013.01); *B32B 27/12* (2013.01); *B32B 27/283* (2013.01); *B32B 27/40* (2013.01); *B41M 5/443* (2013.01); *B60J 10/0002* (2013.01); *C08G 18/61* (2013.01); *C08G 71/04* (2013.01); *C08L 83/04* (2013.01); *C09D 183/04* (2013.01); *D06N 3/0036* (2013.01); *D06N 3/128* (2013.01); *D06N 3/14* (2013.01); *D06N 3/146* (2013.01); *B32B 2307/21* (2013.01); *B32B 2307/306* (2013.01); *B32B 2307/584* (2013.01); *B32B 2307/714* (2013.01); *B41M 2205/30* (2013.01); *B60R 13/02* (2013.01); *C08G 2150/00* (2013.01); *D06N 2201/0227* (2013.01); *D06N 2209/046* (2013.01); *D06N 2209/105* (2013.01); *D06N 2209/143* (2013.01); *D10B 2321/121* (2013.01); *D10B 2331/04* (2013.01); *Y10S 428/904* (2013.01); *Y10T 428/249921* (2015.04); *Y10T 428/31551* (2015.04); *Y10T 428/31573* (2015.04); *Y10T 428/31587* (2015.04); *Y10T 442/20* (2015.04)

(58) Field of Classification Search
CPC .... C08G 18/58; C08G 18/61; C08G 18/7825; C08G 71/04; C09D 175/04; C09D 183/04; D06N 3/14; D06N 3/142; D06N 2211/28; C08L 83/04; Y10T 442/204; Y10T 28/31551; Y10T 442/20; Y10T 428/31551; Y10S 428/904; B60R 13/02; B32B 27/40; B32B 27/283
USPC ...................... 428/424.8, 904, 423.1; 442/59; 524/500, 588, 590, 267; 528/28, 27; 525/453
See application file for complete search history.

(56) References Cited

U.S. PATENT DOCUMENTS

| | | |
|---|---|---|
| 3,072,613 A | 1/1963 | Whelan et al. |
| 4,299,868 A | 11/1981 | Berndt et al. |
| 4,480,009 A | 10/1984 | Berger |
| 4,484,994 A | 11/1984 | Jacobs et al. |

| | | | | | | |
|---|---|---|---|---|---|---|
| 4,499,149 | A | 2/1985 | Berger | JP | 2011-132509 | 7/2011 |
| 4,520,167 | A | 5/1985 | Blank et al. | KR | 1986-0002192 B | 12/1986 |
| 4,631,320 | A | 12/1986 | Parekh et al. | WO | WO 89/00565 | 1/1989 |
| 4,758,632 | A | 7/1988 | Parekh et al. | WO | WO 2008/142109 | 11/2008 |
| 4,806,611 | A | 2/1989 | Honel et al. | WO | WO 2009/112418 | 9/2009 |
| 4,883,854 | A | 11/1989 | Coury et al. | WO | WO 2011/065129 | 6/2011 |
| 4,895,829 | A | 1/1990 | Hanada et al. | WO | WO 2011/065432 | 6/2011 |
| 4,897,435 | A | 1/1990 | Jacobs et al. | WO | WO 2011/065433 | 6/2011 |
| 4,910,087 | A | 3/1990 | Torii et al. | WO | WO 2011/162237 | 12/2011 |
| 5,237,021 | A | 8/1993 | Ishii et al. | WO | WO 2012/026338 | 3/2012 |
| 5,324,797 | A | 6/1994 | Ishii et al. | | | |
| 5,606,077 | A | 2/1997 | Lersch et al. | | | |
| 5,686,547 | A | 11/1997 | Nye | | | |
| 6,120,905 | A | 9/2000 | Figovsky | | | |
| 6,379,751 | B1 | 4/2002 | Schäfer et al. | | | |
| 6,784,300 | B2 | 8/2004 | Cetin et al. | | | |
| 2006/0276599 | A1 | 12/2006 | DeWitt et al. | | | |
| 2007/0059597 | A1 | 3/2007 | Nakanishi et al. | | | |
| 2007/0134502 | A1 | 6/2007 | Fonda | | | |
| 2007/0135588 | A1 | 6/2007 | Diakoumakos et al. | | | |
| 2008/0026154 | A1 | 1/2008 | Jones et al. | | | |
| 2009/0018302 | A1 | 1/2009 | Laas et al. | | | |
| 2010/0210809 | A1 | 8/2010 | Simon et al. | | | |
| 2011/0039948 | A1 | 2/2011 | Lange et al. | | | |
| 2012/0231184 | A1 | 9/2012 | Hanada | | | |
| 2012/0232289 | A1 | 9/2012 | Hanada | | | |
| 2012/0237701 | A1 | 9/2012 | Hanada | | | |
| 2013/0095715 | A1 | 4/2013 | Hanada | | | |
| 2013/0171896 | A1 | 7/2013 | Hanada | | | |
| 2014/0024274 | A1 | 1/2014 | Hanada | | | |

OTHER PUBLICATIONS

Zhu et al.: "New polysiloxanes bearing cyclic carbonate side chains: synthesis and ionic conductivity studies"; Polymer Preprints (1994) vol. 35, No. 1, p. 496-497—2 pages.
Zhu et al.: "Synthesis of Polysiloxanes Bearing Cyclic Carbonate Side Chains. Dielectric Properties and Ionic Conductivities of Lithium Triflate Complexes"; Macromolecules (1994) vol. 27, No. 15, p. 4076-4079—4 pages.
Lang et al.(2009): STN International HCAPLUS database, Columbus (OH), accession No. 2009: 1141958.
Kihara et al.: "Catalytic Activity of Various Salts in the Reaction of 2,3-Epoxypropyl Phenyl Ether and Carbon Dioxide under Atmospheric Pressure"; J. Org. Chem. 58 (1993), pp. 6198-6202.
Kihara et al.: Synthesis and Properties of Poly(hydroxyurethane)s, J. Polymer Sci., Part A Polymer Chem., 31(11), (1993), pp. 2765-2773.
Extended European Search Report, Mar. 25, 2015; European Patent Application No. 11798121.7 (4 pages).

*Primary Examiner* — Bruce H Hess
(74) *Attorney, Agent, or Firm* — Hamre, Schumann, Mueller & Larson, P.C.

FOREIGN PATENT DOCUMENTS

| | | |
|---|---|---|
| EP | 390777 | 10/1990 |
| EP | 1143063 | 10/2001 |
| EP | 2505600 | 10/2012 |
| EP | 2610276 | 7/2013 |
| JP | 56-4408 | 1/1981 |
| JP | 58-13359 B | 3/1983 |
| JP | 61-227087 | 10/1986 |
| JP | 62-202786 | 9/1987 |
| JP | 63-166854 | 7/1988 |
| JP | 2-102096 | 4/1990 |
| JP | 3-501121 | 3/1991 |
| JP | 5-65341 | 3/1993 |
| JP | 06-025604 | 2/1994 |
| JP | 06-247151 | 9/1994 |
| JP | 7-10991 | 1/1995 |
| JP | 8-109349 | 4/1996 |
| JP | 8-225670 | 9/1996 |
| JP | 8-245787 | 9/1996 |
| JP | 8-245791 | 9/1996 |
| JP | 9-278982 | 10/1997 |
| JP | 10-67857 | 3/1998 |
| JP | 10-251405 | 9/1998 |
| JP | 11-140182 | 5/1999 |
| JP | 2000-319504 | 11/2000 |
| JP | 2001-234071 | 8/2001 |
| JP | 2002-114936 | 4/2002 |
| JP | 2002-518532 | 6/2002 |
| JP | 2004-51901 | 2/2004 |
| JP | 2005-154580 | 6/2005 |
| JP | 2005-336637 | 12/2005 |
| JP | 2006-176615 | 7/2006 |
| JP | 2006-307015 | 11/2006 |
| JP | 2006-336015 | 12/2006 |
| JP | 2007-501886 | 2/2007 |
| JP | 2007-77075 | 3/2007 |
| JP | 2007-270373 | 10/2007 |
| JP | 2007-297544 | 11/2007 |
| JP | 2008-502765 | 1/2008 |
| JP | 2008-56772 | 3/2008 |
| JP | 2008-297552 | 12/2008 |
| JP | 2009-30050 | 2/2009 |
| JP | 2009-520082 | 5/2009 |
| JP | 2009-144313 | 7/2009 |
| JP | 2009-155407 | 7/2009 |

(57) ABSTRACT

Disclosed are a polysiloxane-modified polyhydroxy polyurethane resin characterized by being derived from a reaction between a 5-membered cyclic carbonate polysiloxane compound represented by the below-described formula (1) and an amine compound, and its production process; and a resin composition, thermal recording medium, imitation leather, thermoplastic polyolefin resin skin material, weather strip material, and weather strip, all of which make use of the resin.

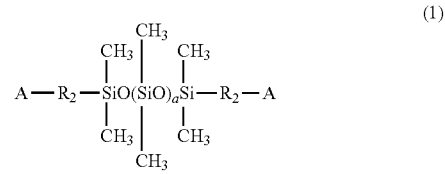

(1)

wherein A means

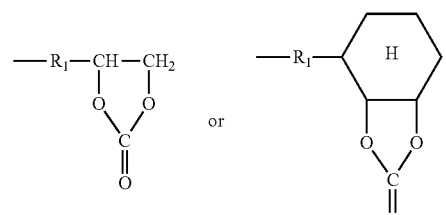

24 Claims, 2 Drawing Sheets

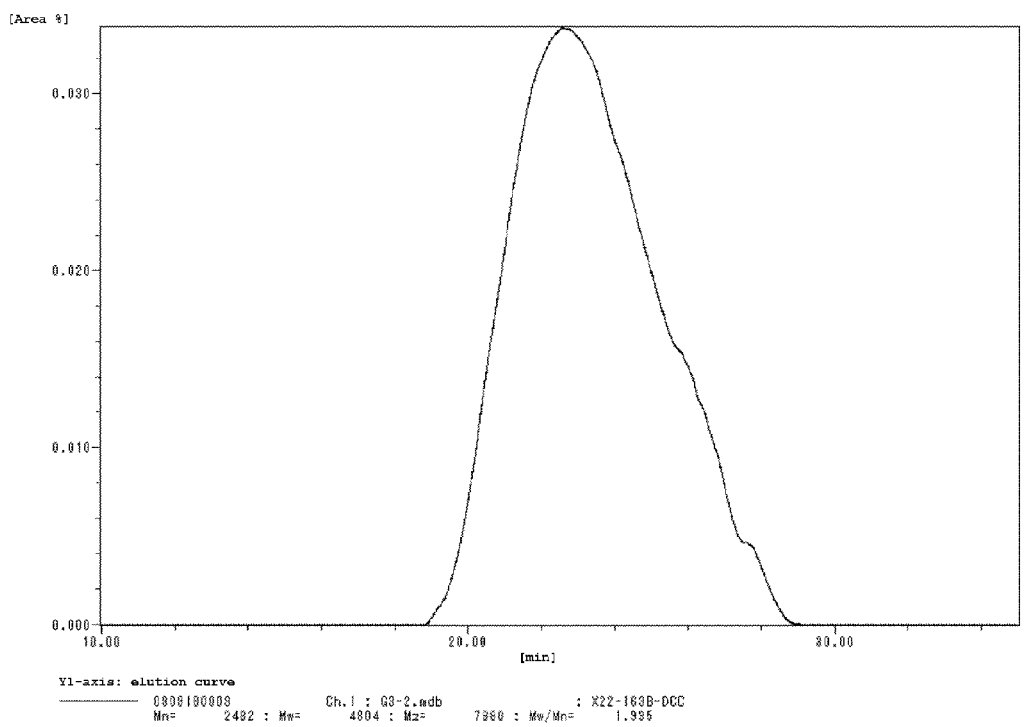

POLYSILOXANE-MODIFIED POLYHYDROXY POLYURETHANE RESIN, METHOD FOR PRODUCING SAME, HEAT-SENSITIVE RECORDING MATERIAL USING THE RESIN, IMITATION LEATHER, THERMOPLASTIC POLYOLEFIN RESIN SKIN MATERIAL, MATERIAL FOR WEATHER STRIP, AND WEATHER STRIP

TECHNICAL FIELD

This invention relates to a novel polysiloxane-modified polyhydroxy polyurethane resin and its production process, and further, to utilization technologies of the resin. More specifically, this invention is concerned with the provision of a novel polysiloxane-modified polyhydroxy polyurethane resin, which is excellent in properties such as lubricity, abrasion resistance, chemical resistance, non-tackiness, antistatic properties and heat resistance and is useful as a raw material for film and molding materials, various coating materials and various binders, and also with utilization technologies of the resin. This invention also pertains to technologies for the provision of environment-responsive products, because the resin can use carbon dioxide as its production raw material and can hence bring about reduction effect on carbon dioxide which has become problematic on a global scale.

As its specific application embodiments, the following embodiments can be mentioned.

(1) A thermal recording medium, which is provided on a back side thereof with a heat-resistant protective layer formed of the polysiloxane-modified polyhydroxy polyurethane resin and which is useful in thermal fusion transfer recording methods and thermal sublimation transfer recording methods.

(2) An imitation leather, which can be obtained by using a composition containing the polysiloxane-modified polyhydroxy polyurethane resin as a principal component and which is excellent in hand feeling, lubricity, scratch resistance, abrasion resistance and chemical resistance.

(3) A skin material made of a thermoplastic polyolefin resin, which uses the polysiloxane-modified polyhydroxy polyurethane resin for the formation of a top coat layer, is useful in a car interior trim material, home electric appliance component or part, or the like, and can form a film a surface of which is excellent in lubricity, surface touch feeling, scratch resistance, abrasion resistance, chemical resistance and uniform matting effect.

(4) A weather strip, which employs a high-molecular elastomer material as a base material and uses the polysiloxane-modified polyhydroxy polyurethane resin in a surface treatment layer formed at a slide contact portion, where the weather strip is to be brought into sliding contact with another part, to provide the surface treatment layer with excellent lubricity, abrasion resistance, heat resistance and weatherability.

BACKGROUND ART

Polyhydroxy polyurethane resins, which make use of carbon dioxide as a raw material, are known for some time as reported in Non-patent Documents 1 and 2. Under the current situation, however, the development of their applications has not moved ahead, because the above-described, conventionally-known resins are evidently inferior in characteristics to polyurethane-based resins as conventional, fossil-based high-molecular compounds (fossil-based plastics) (see Patent Documents 1 and 2).

However, the global warming phenomenon which can be considered to be attributable to the ever-increasing emission of carbon dioxide has become a worldwide problem in recent years, and a reduction in carbon dioxide emissions has arisen as a critical issue for the entire world so that there is an outstanding desire for a technology that makes it possible to use carbon dioxide as a production raw material. The change to renewable resources such as biomass and methane has also become a worldwide trend from the viewpoint of the problem of exhaustible fossil resources (petroleum).

Under such a background as described above, polyhydroxy polyurethane resins are drawing a fresh look again. Described specifically, carbon dioxide which is a raw material for these resins is a readily-available and sustainable carbon resource, and moreover, plastics that make use of carbon dioxide as a replacement for fossil resources can be considered to be an effective means for resolving problems such as the above-described warming and resource depletion.

It is, therefore, very preferable from the foregoing situation to realize the above-described replacement to polyhydroxy polyurethane resins, which can use carbon dioxide as a production raw material, in various applications where polyurethane-based resins as conventional fossil-based high-molecular compounds (fossil-based plastics) are used. Nonetheless, the conventional polyhydroxy polyurethane resins are inferior in characteristics to the fossil-based plastics as mentioned above. To spur the development of their applications, it is, therefore, essential to take into full consideration the circumstances in the respective applications and the performances suited for them and to develop resins capable of meeting these issues or requirements. A description will hereinafter be made about the conventional technologies in the respective applications.

(Thermal Recoding Media)

Conventionally-known thermal recording media include thermal fusion transfer recording media and thermal sublimation transfer recording media. In each thermal fusion transfer recording medium, a thermal recording layer (ink layer) is formed with a dye or pigment carried in a binder resin or the like on one side of a base sheet such as a polyester film, and from the back side of the base sheet, heat is applied in a pattern to transfer the ink layer onto a receiving medium. In each thermal sublimation transfer recording medium, on the other hand, a heat sublimation dye is used as a dye, and the dye alone is allowed to sublime such that it is likewise transferred onto a receiving medium.

These methods both employ the principle that thermal energy is applied by a thermal head from the back side of a base sheet, and therefore, the back side of the base sheet of a thermal recording medium to be used is required to have sufficient lubricity, separability, non-tackiness and the like with respect to the thermal head and the thermal head is also required not to stick to the back side (sticking phenomenon). Accordingly, there has been proposed, for example, a technology that forms a back side layer of a silicone resin, melamine resin, phenol resin, polyimide resin, modified cellulose resin or a mixture thereof on the back side of a base material sheet in a thermal recording medium (see Patent Document 3).

To form a heat-resistant protective layer on the above-described thermal recording medium with a view to providing its back side with heat resistance, attempts have been made, for example, to use various crosslinking agents in the above-described resins to thermally crosslink them or to add inorganic fillers, fluorinated resin powders or the like to these resins. These attempts can provide heat resistance, but are insufficient as measures for improving the lubricity and non-tackiness to a thermal head. Only the silicone resin out of the above-described resins is equipped with lubricity and non-tackiness, but this resin involves another problem in that damage is given to the base sheet, which is generally a thin film of from 2 to 5 μm thickness, in a heating step conducted to completely crosslink the resin. When the thermal recording medium is incompletely crosslinked to protect the base sheet from damage, on the other hand, the winding of the thermal recording medium into a roll form allows an unreacted, low-molecular silicone in the heat-resistant protective layer, which is formed on the back side of the base sheet, to migrate into the ink layer located in contact with the surface of the heat-resistant protective layer. As a result, a problem arises such that an image formed with such a thermal recording medium is unclear.

It is also known to use a silicone-acrylic graft or block copolymer in the heat-resistant protective layer. When a thermal recording medium is produced by this method, however, the heat resistance can be improved a little but the film-forming property of the acrylic component is insufficient so that the heat-resistant protective layer may separate from the base material. Moreover, this method is accompanied by a drawback that the heat-resistant protective layer is prone to abrasion and worn-out fragments of the protective layer deposit on a thermal head, thereby inducing new problems such as poor traveling and poor printing of the thermal recording medium and a reduced service life of the thermal head.

The present inventors studied on methods for solving these various problems, and proposed that the use of various silicone polyurethane copolymer resins makes it possible to obtain thermal recording media having a heat-resistant protective layer equipped with heat resistance, slidability, non-tackiness and the like in combination (see Patent Documents 4 to 6). These proposals were, however, not studied from the viewpoint of the preservation of the global environment, which has become a worldwide issue in recent years. It is, therefore, desired to review these technologies from such a new viewpoint.

(Imitation Leathers)

Conventionally, imitation leathers have been used in pouches, bags, shoes, furniture, clothing, vehicle interior trim materials, electric appliances, and the like. As resins for these imitation leathers, polyurethane-based resins are widely used. The term "imitation leather" is a generic term for leather-like products manufactured resembling natural leathers. In general, imitation leathers can be roughly divided into artificial leathers, synthetic leathers, and vinyl chloride leathers.

Artificial leathers have a structure closest to that of natural leathers among imitation leathers, and use a non-woven fabric as a base fabric. As a process for the production of a general artificial leather, there is a process to be described hereinafter. After a nonwoven fabric is first impregnated with a solution of a polyurethane-based resin in dimethylformamide (hereinafter, DMF), the polyurethane-based resin is solidified and dried into a porous form by wet-process film formation (submerged solidification). Subsequently, its surface is further coated with a polyurethane-based resin or provided with a laminated layer of the polyurethane-based resin to present a smooth tone, or its surface is ground to raise fibers such that a suede tone is presented.

On the other hand, synthetic leathers use, as a base fabric, a fabric such as a woven fabric or raised blanket, and in general, are roughly divided into dry-process synthetic leathers and wet-process synthetic leathers. For the production of a dry-process synthetic leather, there are two processes, one being to coat a polyurethane-based resin directly on a base fabric and to dry it, and the other to coat a polyurethane-based resin on a sheet of release paper, to dry the polyurethane-based resin into a film, and then to bond the film and a base fabric together with an adhesive. On the other hand, a wet-process synthetic leather can be produced by impregnating or coating a base fabric with the above-mentioned solution of the polyurethane-based resin in DMF and then subjecting the polyurethane-based resin to submerged solidification and drying to form a porous layer. Further, the surface of the synthetic leather obtained by the dry process or wet process as described above is coated with a polyurethane-based resin or provided with a laminated layer of the polyurethane-based resin to present a smooth tone, or the surface is ground to raise fibers such that a suede tone is presented.

There is an increasing consciousness towards the preservation of the global environment in recent years. The change to renewable resources such as biomass and methane has become a worldwide trend from the viewpoint of the problem of exhaustible fossil resources (petroleum). Under such a background, more and more makers are also positively working on environmental measures in the field of imitation leather products in recent years, resulting in a move toward forming imitation leather products by using materials excellent in environmental preservation properties. A great deal of research is hence under way, for example, to reduce VOC (volatile organic compound) emissions as much as possible by using as polyurethane-based resin those which are dispersible or emulsifiable in water-based media in place of organic solvents or to use plant-derived raw materials from the viewpoint of carbon neutral (Patent Documents 7 to 9). However, the resulting imitation leather products are still different in performance compared with the conventional products, and therefore, are considered to have problems for practical applications. Moreover, these approaches are still insufficient in respect to the solution of new environmental problems such as the reduction of carbon dioxide emissions, which has become a critical worldwide issue.

(Skin Materials Made of Thermoplastic Polyolefin Resins)

The recycling of vehicle interior trim materials (instrument panels, door trims, etc.) and home electric appliance components and parts is strongly desired to decrease waste materials as much as possible after use in view of the garbage-related problems and environment-related problems in recent years. From this viewpoint, thermoplastic polyolefins, for example, polypropylene (PP), ABS resin, AS resin, polyolefin-based thermoplastic elastomers (TPO) and the like are used as skin materials for vehicle interior trim materials and home electric appliance components and parts in recent years. However, these thermoplastic polyolefins are inferior in surface adhesiveness, scratch resistance, abrasion resistance and chemical resistance in comparison with vinyl chloride resin and the like which have been conventionally used, and therefore, are required to apply coatings in order to improve them in these properties. It is also necessary to provide artistry for giving a high-grade appearance, and especially in the case of car interior trim materials, to consider not only artistry but also an attention to anti-glare properties for drivers and like properties. It is, therefore, a current practice to apply various coatings to thermoplastic polyolefin base materials such that top coat layers are formed to impart a function to their surfaces for the provision of still better skin materials.

In the coating formulations to be employed as described above, the below-described resins and the like are used, and a variety of studies have been made on such resins. Proposals have been made including, for example, a method that employs a coating formulation making use of a chlorinated polypropylene-modified acrylic resin, which has good adhesiveness to polyolefin-based resins such as PP resin and TPO resin, as a binder and containing a matting agent such as an inorganic extender pigment (silica or talc) or acrylic resin particles added thereto and a method that applies a chlorinated polypropylene-based primer and then applies on the primer a coating formulation containing a polyester resin or polyurethane resin.

There is an increasing consciousness towards the preservation of the global environment in recent years. The change to renewable resources such as biomass and methane has become a worldwide trend from the viewpoint of the problem of exhaustible fossil resources (petroleum). Under such a situation, more and more makers are also positively working on environmental measures in the field of the above-descried skin materials made of thermoplastic polyolefin resins in recent years, resulting in a move toward forming such products by using materials excellent in environmental preservation properties. A great deal of research is hence under way, for example, to avoid choosing specific solvents (toluene and the like) from organic solvents for use in the above-described coating formulations or to use water-based resins instead of organic solvents for reducing VOC (volatile organic compound) emissions as much as possible (Patent Documents 10 to 12). However, these approaches are also still insufficient in respect to the solution of new environmental problems such as the reduction of carbon dioxide emissions, which has become a critical worldwide issue.

(Weather Strip Materials)

As materials for forming weather strips such as glass runs, door weather strips, body side weather strips, inside seals and outside seals in cars and buildings, high-molecular elastomer materials such as chloroprene rubber, styrene-butadiene rubber, nitrile rubber and EPDM rubber have been used conventionally. It is a common practice to form surface treatment layers on the surfaces of these weather strips by a method such as coating or impregnation such that performance such as lubricity, abrasion resistance, mold release properties, heat resistance, water resistance and weatherability can be imparted.

As materials for forming such surface treatment layers, a variety of coating formulations have been proposed including one containing a thermosetting polyurethane resin and a silicone oil added thereto (see Patent Document 13), one containing a thermosetting polyurethane resin and an organopolysiloxane added thereto (see Patent Document 14), and one composed of a urethane prepolymer, a silicone oil, hydrophobic silica and a polyisocyanate (see Patent Document 15).

On the other hand, there is an increasing consciousness towards the preservation of the global environment in recent years. The change to renewable resources such as biomass and methane has become a worldwide trend from the viewpoint of the problem of exhaustible fossil resources (petroleum). Under such a situation, more and more makers are positively working on environmental measures, resulting in a move toward forming weather strips by using materials excellent in environmental preservation properties. A great deal of research is hence under way, for example, to avoid choosing specific solvents (toluene and the like) from organic solvents for use in the above-described coating formulations or to use water-based resins instead of organic solvents for reducing VOC (volatile organic compound) emissions as much as possible (see Patent Document 16). However, these approaches are also still insufficient in respect to the solution of new environmental problems such as the reduction of carbon dioxide emissions, which has become a critical worldwide issue.

PRIOR ART DOCUMENTS

Non-patent Documents

Non-patent Document 1: N. Kihara, T. Endo, J. Org. Chem., 58, 6198 (1993)
Non-patent Document 2: N. Kihara, T. Endo, J. Polymer Sci., Part A Polymer Chem., 31(11), 2765 (1993)

Patent Documents

Patent Document 1: U.S. Pat. No. 3,072,613
Patent Document 2: JP-A-2000-319504
Patent Document 3: JP-B-58-13359
Patent Document 4: JP-A-61-227087
Patent Document 5: JP-A-62-202786
Patent Document 6: JP-A-2-102096
Patent Document 7: JP-A-2009-144313
Patent Document 8: JP-A-2007-270373
Patent Document 9: JP-A-2005-154580
Patent Document 10: JP-A-2006-307015
Patent Document 11: JP-A-2004-51901
Patent Document 12: JP-A-2006-176615
Patent Document 13: JP-A-56-4408
Patent Document 14: JP-A-8-225670
Patent Document 15: JP-A-8-109349
Patent Document 16: JP-A-2008-56772

DISCLOSURE OF THE INVENTION

Problem to be Solved by the Invention

As mentioned above, polyhydroxy polyurethane resins that make use of carbon dioxide as a production raw material are known for some years, but are inferior in performance. To use them for industrial applications as replacements for fossil-based plastics, they, however, need to be provided with improved performance and a new additional value. Described specifically, also from the viewpoint of a reduction in carbon dioxide emissions, there is an outstanding desire for the development of a resin that can further improve the performance indispensable for industrial applications, such as heat resistance, chemical resistance and abrasion resistance. To apply the above-described resins for the above-mentioned respective use, there are desires to be described below for the respective resins.

An object of the present invention is, therefore, to develop a novel resin, which can satisfy characteristics required for the respective applications, can use carbon dioxide as a production raw material, and moreover, can provide environment-responsive products also excellent from the viewpoint of the preservation of the global environment.

(Thermal Recording Media)

Keeping in step with the adoption of thermal heads of higher temperatures and base material sheets of smaller thicknesses as a result of the move toward higher printing speeds in recent years, still higher heat resistance, lubricity and non-tackiness, a countermeasure against static electricity to be produced upon peeling a film, and the like are required for the heat-resistant protective layer on the backside. In addition, there is also a need for making improvements in the situation that the conventional thermal recording media (materials) are hardly recyclable as valuable resources after use and have resulted in the generation of massive waste.

It is, therefore, required to develop a technology that can provide a thermal recording medium as an environment-responsive product also excellent from the viewpoint of the preservation of the global environment although it has a heat-resistant protective layer excellent in heat resistance, slidability and non-tackiness.

(Imitation Leathers)

Concerning imitation leathers, it is desired to develop an environment-responsive product which has still higher pliability, is excellent in surface lubricity, scratch resistance, abrasion resistance and chemical resistance, and has environmental preservation properties on a global scale.

(Skin Materials Made of Thermoplastic Polyolefin Resins)

In respect to skin materials made of thermoplastic polyolefin resins for use in vehicle interior trim materials and home electric appliance components and parts, it is desired to develop an environment-responsive product which has still higher surface lubricity, scratch resistance, abrasion resistance and chemical resistance and if necessary, also excellent uniform matting effect, and has environmental preservation properties on a global scale.

It is, therefore, required to develop a technology capable of providing a skin material made of a thermoplastic polyolefin resin, which is a skin material made of the thermoplastic polyolefin material and having the above-described excellent properties, and is also a superb environment-responsive product.

(Weather Strips)

It is very useful if a surface treatment layer to be arranged by a method such as coating or impregnation on a weather strip for a car or building can be formed as an environment-responsive product which is excellent especially in basic properties such as lubricity, abrasion resistance, heat resistance and weatherability and has environmental preservation properties on a global scale.

There is, accordingly, a desire for a technology capable of providing a material, which is useful in forming a surface treatment layer at a slide contact portion of a high-molecular elastomer material making up a weather strip, said slide contact portion being to be brought into sliding contact with another part, and which can provide the resulting surface treatment layer with excellent lubricity, abrasion resistance, heat resistance and weatherability although it is a material contributable to environmental preservation properties.

Means for Solving the Problem

The above-described object can be achieved by the present invention to be described hereinafter. Specifically, the present invention provides a polysiloxane-modified polyhydroxy polyurethane resin characterized by being derived from a reaction between a 5-membered cyclic carbonate polysiloxane compound represented by the following formula (1) and an amine compound:

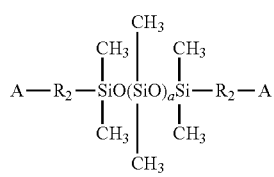

(1)

wherein A means

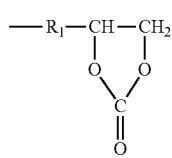 or 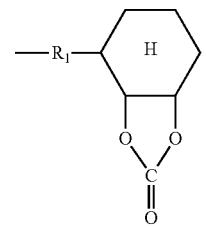

in which $R_1$ means an alkylene group which has from 1 to 12 carbon atoms and may have therein a linkage by an element of O, S or N and/or a linkage by $—(C_2H_4O)_b—$, $R_2$ means a direct bond or an alkylene group having from 2 to 20 carbon atoms, $R_2$ may be linked to an alicyclic group or aromatic group, b stands for a number of from 1 to 300, and a stands for a number of from 1 to 300.

The present invention also provides, as another embodiment, a process for producing a polysiloxane-modified polyhydroxy polyurethane resin, which comprises deriving from a reaction between a 5-membered cyclic carbonate polysiloxane compound represented by the formula (1) and an amine compound. As its preferred embodiment, it is possible to mention the above-described process for producing the polysiloxane-modified polyhydroxy polyurethane resin, wherein as the 5-membered cyclic carbonate polysiloxane compound, a 5-membered cyclic carbonate polysiloxane compound obtained by reacting an epoxy-modified polysiloxane compound represented by the following formula (2) with carbon dioxide is used:

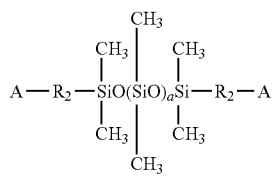

(2)

wherein A means

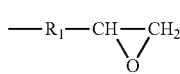 or 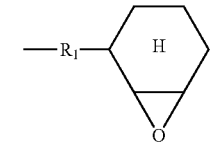

in which $R_1$ means an alkylene group which has from 1 to 12 carbon atoms and may have therein a linkage by an element of O, S or N and/or a linkage by $—(C_2H_4O)_b—$, $R_2$ means a direct bond or an alkylene group having from 2 to 20 carbon atoms, $R_2$ may be linked to an alicyclic group or aromatic group, b stands for a number of from 1 to 300, and a stands for a number of from 1 to 300.

The present invention also provides a thermal recording medium having a base material sheet, a thermal recording layer arranged on at least one side of the base material sheet, and a heat-resistant protective layer arranged on another side of the base material sheet, said another side being a back side to be brought into contact with a thermal head, wherein the heat-resistant protective layer is formed with a resin composition that comprises at least the above-described polysiloxane-modified polyhydroxy polyurethane resin.

The present invention also provides an imitation leather comprising a base fabric and a resin composition comprising as a principal component thereof the above-described polysiloxane-modified polyhydroxy polyurethane resin and impregnated in or laminated on the base fabric.

The present invention also provides a skin material made of a thermoplastic polyolefin resin, comprising a thermoplastic polyolefin resin sheet and a top coat layer formed directly or via a primer layer on the sheet, wherein the top coat layer comprises as a principal component thereof the above-described polysiloxane-modified polyhydroxy polyurethane resin.

The present invention also provides a weather strip material for coating and/or impregnating a high-molecular elastomer material to form a surface treatment layer at a slide contact portion to be brought into sliding contact with another part, comprising a resin composition which comprises the above-described polysiloxane-modified polyhydroxy polyurethane resin. The present invention also provides a weather strip comprising a high-molecular elastomer material and the weather strip material coated on and/or impregnated in the high-molecular elastomer material to form a surface treatment layer at a slide contact portion to be brought into sliding contact with another part, wherein the surface treatment layer has been crosslinked with a crosslinking agent reactable with hydroxyl groups in a structure of the polysiloxane-modified polyhydroxy polyurethane resin in the weather strip material.

Advantageous Effects of the Invention

The polysiloxane-modified polyhydroxy polyurethane resin provided by the present invention can form a film excellent in lubricity, abrasion resistance, chemical resistance, non-tackiness, antistatic properties, heat resistance and the like, and can replace conventional fossil-based plastics. As the resin provided by the present invention can use carbon dioxide as a production raw material, the present invention makes it possible to provide products which are responsive to the global environment and can contribute to a reduction in carbon dioxide as a greenhouse gas. More specifically, the present invention can provide various products to be described hereinafter.

(Thermal Recording Medium)

In the present invention, the formation of a heat-resistant protective layer with the polysiloxane-modified polyhydroxy polyurethane resin on a back side makes it possible to provide a thermal recording medium which is excellent in the heat resistance, lubricity and non-tackiness of the heat-resistant protective layer, the adhesiveness of the heat-resistant protective layer to a base sheet, and further, the antistatic effect and the like of the heat-resistant protective layer. As the above-described resin can provide such an excellent thermal recording medium and at the same time, can use carbon dioxide as a raw material and can incorporate carbon dioxide in the resin, it is possible to provide a thermal recording medium also useful as an environment-responsive product that contributes to a reduction in greenhouse gas.

(Imitation Leather)

According to the present invention, there is provided an imitation leather having a hand feeling, which is noway inferior to those of conventional imitation leather products, and is also provided with excellent surface lubricity, scratch resistance, abrasion resistance and chemical resistance. In addition, the resin with carbon dioxide incorporated and fixed therein can be used as a material for forming the imitation leather. The imitation leather is provided as an environment-responsive product, which can also contribute to a reduction in carbon dioxide considered to be a worldwide problem as a greenhouse gas, and is also excellent from the viewpoint of the preservation of the global environment.

(Skin Material Made of Thermoplastic Polyolefin Material)

In the present invention, the use of the specific polysiloxane-modified polyhydroxy polyurethane resin as a material for forming a top coat, which makes up a skin material made of a thermoplastic polyolefin material, makes it possible to provide the surface of the resulting skin material with excellent lubricity, surface touch feeling, scratch resistance, abrasion resistance, chemical resistance, and if necessary, uniform matting effect. In addition, the resin with carbon dioxide incorporated and fixed therein can be used as a material for forming the top coat layer, thereby making it possible to provide the skin material made of the thermoplastic polyolefin resin as an environment-responsive product capable of also contributing to a reduction in carbon dioxide which is considered to be a worldwide problem as a greenhouse gas.

(Weather Strip)

According to the present invention, there is provided a useful material for forming a surface treatment layer at a slide contact portion of a high-molecular elastomer material as a base material in a weather strip for a car or building, said slide contact portion being to be brought into sliding contact with another part. The material provides the resulting surface treatment layer with excellent lubricity, abrasion resistance, heat resistance and weatherability although it contributes to environmental preservation properties. More specifically, a composition with the polysiloxane-modified polyhydroxy polyurethane resin included therein is used as a coating formulation for the surface treatment of a high-molecular elastomer in the present invention, so that the resulting surface treatment layer is excellent in the above-described basic properties. Moreover, carbon dioxide which is considered to be a greenhouse gas can be used as its production raw material, thereby making it possible to provide a material also useful from the viewpoint of the preservation of the global environment and further, an environment-responsive product which makes use of the material.

BRIEF DESCRIPTION OF THE DRAWINGS

FIG. 3 shows a GPC elution curve of the 5-membered cyclic carbonate polysiloxane (mobile phase: THF, column: "TSK-GEL GMHXL+G2000HXL+G3000HXL", detector: IR detector)

MODES FOR CARRYING OUT THE INVENTION

Figure 1:
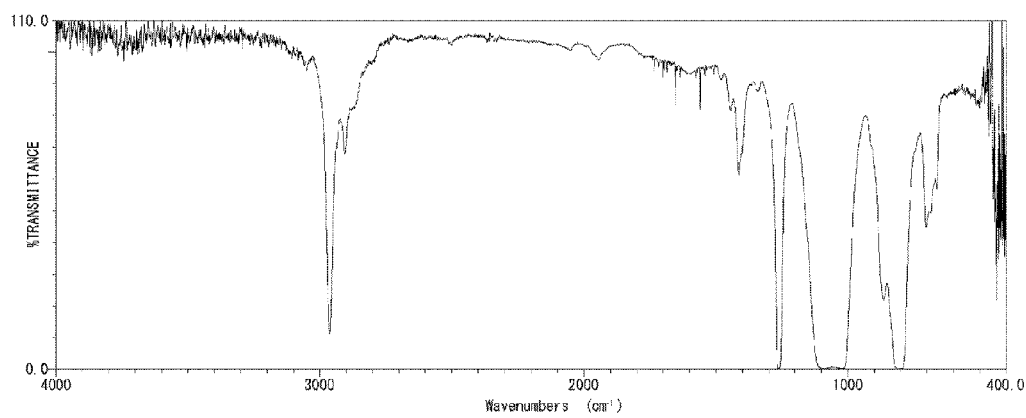
FIG. 1 is an infrared absorption spectrum of an epoxy-modified polysiloxane.

The present invention will next be described in further detail based on preferred embodiments.

<Polysiloxane-Modified Polyhydroxy Polyurethane Resin>

The polysiloxane-modified polyhydroxy polyurethane resin according to the present invention (which may hereinafter be called simply "the resin according to the present invention" or "the resin for use in the present invention") is characterized by being derived from a reaction between a 5-membered cyclic carbonate polysiloxane compound represented by the following formula (1) and an amine compound:

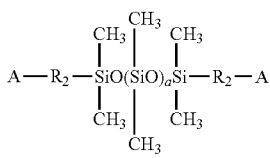

(1)

wherein A means

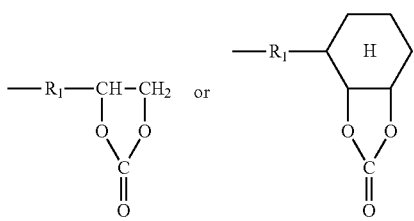

in which $R_1$ means an alkylene group which has from 1 to 12 carbon atoms and may have therein a linkage by an element of O, S or N and/or a linkage by $-(C_2H_4O)_b-$, $R_2$ means a direct bond or an alkylene group having from 2 to 20 carbon atoms, $R_2$ may be linked to an alicyclic group or aromatic group, b stands for a number of from 1 to 300, and a stands for a number of from 1 to 300.

On the other hand, this 5-membered cyclic carbonate polysiloxane compound can be produced, for example, by reacting an epoxy-modified polysiloxane compound with carbon dioxide as shown by the below-described "Equation-A". Described more specifically, it can be obtained by reacting the epoxy-modified polysiloxane compound with carbon dioxide in the presence or absence of an organic solvent, in the presence of a catalyst, at a temperature of from 40° C. to 150° C., under normal pressure or slightly elevated pressure, for from 10 to 20 hours.

Equation-A

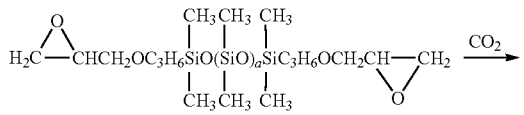

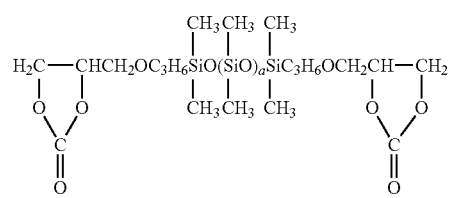

Examples of the epoxy-modified polysiloxane compound, which is usable in the present invention, include such compounds as will be described next.

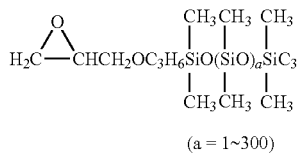 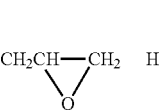

(a = 1~300)

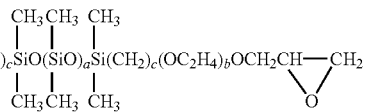

(a = 1~300, b = 1~300, c = 2~6)

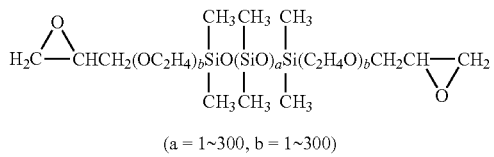

(a = 1~300, b = 1~300)

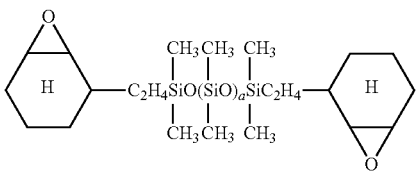

(a = 1~300)

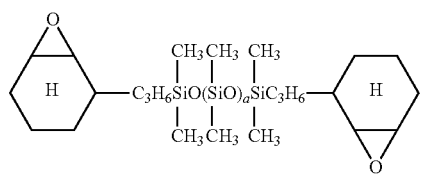

(a = 1~300)

The above-listed epoxy-modified polysiloxane compounds are preferred compounds for use in the present invention, and the present invention shall not be limited to these exemplified compounds. Not only the above-exemplified compounds but also other similar epoxy-modified polysiloxane compounds are available on the market these days. Accordingly, those readily available on the market can all be used in the present invention.

The 5-membered cyclic carbonate polysiloxane compound for use in the present invention can be obtained through the reaction between such an epoxy-modified polysiloxane compound as described above and carbon dioxide. As catalysts usable in this reaction, base catalysts and Lewis acid catalysts can be mentioned. The base catalysts include tertiary amines such as triethylamine and tributylamine; cyclic amines such as diazabicycloundecene, diazabicyclooctane and pyridine; alkali metal salts such as lithium chloride, lithium bromide, lithium fluoride and sodium chloride; alkaline earth metal salts such as calcium chloride; quaternary ammonium salts such as tetrabutyl ammonium chloride, tetraethyl ammonium bromide and benzyl trimethyl ammonium chloride; carbonate salts such as potassium carbonate and sodium carbonate; metal acetates such as zinc acetate, lead acetate, copper acetate and iron acetate; metal oxides such as calcium oxide, magnesium oxide and zinc oxide; and phosphonium salts such as tetrabutyl phosphonium chloride.

The Lewis acid catalysts include tin compounds such as tetrabutyltin, dibutyltin dilaurate, dibutyltin diacetate and dibutyltin octoate.

Such a catalyst may be used in a proportion of from 0.1 to 100 parts by mass, preferably from 0.3 to 20 parts by mass per 50 parts by mass of the epoxy-modified polysiloxane compound. If the above-described catalyst is used in a proportion of smaller than 0.1 parts by mass, the catalyst will be unable to fully exhibit its effects as a catalyst. If the above-described catalyst is used in an unduly large proportion, on the other hand, the resin to be obtained finally may be lowered in various performance. Therefore, such an excessively small or large proportion is not preferred. In such a case that the residual catalyst would induce a serious reduction in performance, however, the reaction mixture may be washed with purified water to remove the residual catalyst.

Organic solvents usable in the reaction between the epoxy-modified polysiloxane compound and carbon dioxide include, for example, dimethylformamide, dimethyl sulfoxide, dimethylacetamide, N-methylpyrrolidone, N-ethylpyrrolidone, tetrahydrofuran, and the like. These organic solvents may also be used as mixed systems with other poor solvents, for example, methyl ethyl ketone, xylene, toluene, tetrahydrofuran, diethyl ether, cyclohexanone, and the like.

The resin according to the present invention can be obtained by reacting the 5-membered cyclic carbonate polysiloxane compound, which has been obtained, for example, through the above-described reaction, with an amine compound in the presence of an organic solvent at a temperature of from 20° C. to 150° C. as shown by the below-described "Equation-B".

As the amine compound for use in the above-described reaction, a diamine is preferred, for example. No particular limitation is imposed on the diamine, and diamines which have been conventionally used in the production of polyurethane resins are all usable. Illustrative are aliphatic diamines such as methylenediamine, ethylenediamine, trimethylenediamine, 1,3-diaminopropane, hexamethylenediamine and octamethylenediamine; aromatic diamines such as phenylenediamine, 3,3'-dichloro-4,4'-diaminodiphenylmethane, 4,4'-methylenebis(phenylamine), 4,4'-diaminodiphenyl ether, 4,4'-diaminodiphenylsulfone, meta-xylylenediamine and para-xylylenediamine; alicyclic diamines such as 1,4-cyclohexanediamine, 4,4'-diaminocyclohexylmethane, 1,4'-diaminomethylcyclohexane and isophorone diamine; and alkanoldiamines such as monoethanoldiamine, aminoethylethanolamine and hydroxyethylaminopropylamine. Other diamines are also available on the market these days. These diamine compounds readily available from the market can all be used in the present invention.

In the polysiloxane-modified polyhydroxy polyurethane resin according to the present invention obtained as described above, the percentage of polysiloxane segments in the resin may preferably be from 1 to 75 mass % in terms of the content of the segments based on the molecule of the resin. Described specifically, a percentage of smaller than 1 mass % leads to insufficient development of a function associated with surface energy based on the polysiloxane segments, and therefore, is not preferred. On the other hand, a percentage of higher than 75 mass % provides the polyhydroxy urethane resin with insufficient performance in mechanical strength, abrasion resistance and the like. The percentage of polysiloxane segments may be more preferably from 2 to 60 mass %, still more preferably from 5 to 30 mass %.

The resin according to the present invention may preferably have a number average molecular weight (a polystyrene-equivalent value as measured by GPC) of from 2,000 to 100,000 or so. Further, one having a number average molecular weight of from 5,000 to 70,000 or so is more preferred.

The resin according to the present invention is derived from the reaction between the above-described 5-membered cyclic carbonate polysiloxane compound represented by the formula (1) and the amine compound. Hydroxyl groups which are formed by the reaction of the 5-membered cyclic carbonate groups in the structure of the resin with the amine compound can, therefore, bring about further improvements in performance. Described specifically, these hydroxyl groups have hydrophilicity and therefore, can significantly improve the adhesiveness of the resin to the base material and can also obtain antistatic effect which is unavailable from conventional products. Furthermore, the use of a reaction between the hydroxyl groups in the structure of the resin and a Equation-B

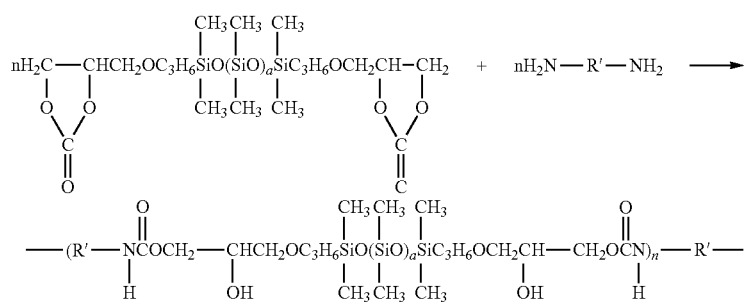

crosslinking agent or the like added to the resin can achieve further improvements in heat resistance, abrasion resistance, chemical resistance and the like, and is suitable, for example, when a surface treatment layer or the like is formed.

The hydroxyl value of the resin according to the present invention may preferably be from 20 to 300 mgKOH/g. If the hydroxyl content is smaller than the above-described range, the carbon dioxide reduction effect is hardly considered to be available sufficiently. If the hydroxyl value exceeds the above-described range, various physical properties as a high molecular compound, such as mechanical/physical properties, become insufficient.

The polysiloxane-modified polyhydroxy polyurethane resin provided by the present invention can be used as a resin crosslinked with a crosslinking agent, although it can be used as it is. As the crosslinking agent usable as described above, any crosslinking agent can be also used insofar as it reacts with the hydroxyl groups in the resin structure. Examples include alkyl titanate compounds and polyisocyanate compounds. No particular limitation is imposed on these polyisocyanate compounds insofar as they are known and have been conventionally used in the crosslinking of polyurethane resins. Illustrative are adducts or the like of polyisocyanates, which have such structural formulas as will be described below, with other compounds.

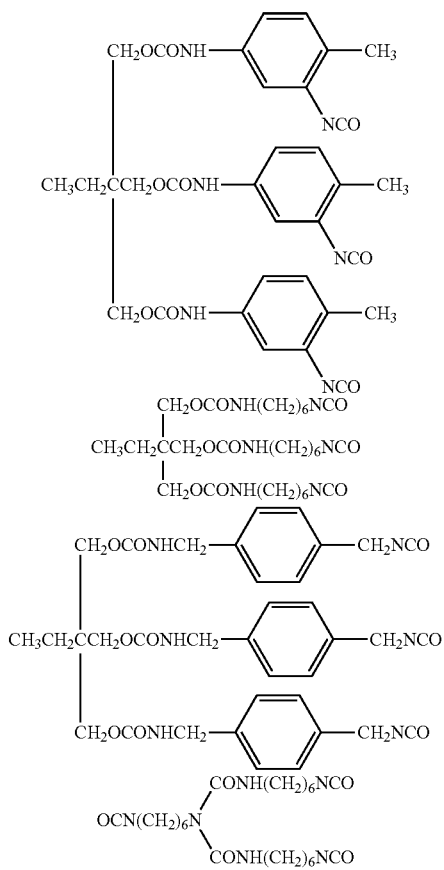

When the resin according to the present invention is used for various applications, for example, for the formation of a film, any desired one or more of conventionally-known various binder resins can be used or mixed, for example, to provide improved coating applicability to the base material and improved film-forming property or to adjust the content of polysiloxane segments. As the binder resin or resins to be used as described above, those chemically reactable with a crosslinking agent such as the above-described polyisocyanate adduct or the like are preferred, although even those having no reactivity can be also used.

As resins to be used as described above, various resins which have been conventionally employed as binders can be used, and no particular limitation is imposed. Usable examples include acrylic resins, polyurethane resins, polyester resins, polybutadiene resins, silicone resins, melamine resins, phenol resins, polyvinyl chloride resins, cellulose resins, alkyd resins, modified cellulose resins, fluorinated resins, polyvinyl butyral resins, epoxy resins, polyamide resins, and the like. It is also possible to use resins obtained by modifying the above-described resins with silicone or fluorine. When a binder resin is used in combination, it may be used or added in a proportion of preferably from 5 to 90 parts by mass, more preferably from 10 to 60 parts by mass or so per 100 parts by mass of the polysiloxane-modified polyhydroxy polyurethane resin according to the present invention.

When the resin according to the present invention is formed, for example, into a film, the polysiloxane segments in the structure of the resin orient in a surface of the film so that the film is provided with heat resistance, lubricity and non-tackiness all of which are characteristics of polysiloxane segments. In addition, the hydroxyl groups in the structure of the resin strongly interact with the base material, on which the film has been formed, at the interface between them, so that the film is provided with excellent adhesiveness to the base material, superb flexibility and outstanding antistatic effect. Therefore, the use of the resin according to the present invention makes it possible to obtain a product of excellent performance. Further, the 5-membered cyclic carbonate polysiloxane compound that makes up the resin according to the present invention can incorporate carbon dioxide in the resin owing to the use of carbon dioxide as a production raw material. The present invention can, therefore, provide an environment-responsive material, which is also useful from the viewpoint of a reduction in carbon dioxide considered to be a cause of global warming and which is unavailable from conventional products.

As has been described above, the polysiloxane-modified polyhydroxy polyurethane resin according to the present invention is very useful as various molding materials, materials for synthetic leathers and artificial leathers, fiber coating materials, surface treatment materials, thermal recording media, strippable materials, paints, binders for printing inks, and the like, and its applications are expected to be promising. A specific description will hereinafter be made about various products that make use of the polysiloxane-modified polyhydroxy polyurethane resin according to the present invention.

<Thermal Recording Medium>

In the thermal recording medium according to the present invention, the thermal recording layer is arranged on at least one side of the base material sheet, and the heat-resistant protective layer is formed on the other side, i.e., the back side of the base material sheet. The thermal recording medium according to the present invention is characterized in that the high-molecular compound, which makes up the heat-resistant protective layer, is the above-described polysiloxane-modified polyhydroxy polyurethane resin. Described specifically, the thermal recording medium according to the present invention is characterized in that the heat-resistant protective layer is formed of the polysiloxane-modified polyhydroxy polyurethane resin of the present invention, which has been derived from the reaction between the 5-membered cyclic carbonate polysiloxane compound represented by the formula (1) and the amine compound, or is formed of a resin composition containing the resin.

The heat-resistant protective layer, which makes up the thermal recording medium according to the present invention, can be formed as a film composed of the above-described polysiloxane-modified polyhydroxy polyurethane resin. Using a crosslinking agent, the film can also be provided as a crosslinked film. As the crosslinking agent usable as described above, any crosslinking agent can be used insofar as it reacts with the hydroxyl groups in the resin structure. Examples include alkyl titanate compounds and polyisocyanate compounds. No particular limitation is imposed on these polyisocyanate compounds insofar as they are known and have been conventionally used in the crosslinking of polyurethane resins. Illustrative are adducts or the like of polyisocyanates, which have such structural formulas as described above, with other compounds.

Upon forming the heat-resistant protective layer on the back side of the base material sheet to form the thermal recording medium according to the present invention, any desired one or more of conventionally-known various binder resins can be added and used in addition to the above-described resin to provide improved coating applicability to the base material sheet and improved film-forming property or to adjust the content of polysiloxane segments. As the binder resin or resins to be used as described above, those chemically reactable with a crosslinking agent such as the above-described polyisocyanate adduct or the like are preferred, although even those having no reactivity can be also used in the present invention.

As binder resins to be used as described above, it is possible to use those employed conventionally for the formation of back-side, heat-resistant protective layers that make up thermal recording media, and no particular limitation is imposed. Usable examples include acrylic resins, polyurethane resins, polyester resins, polybutadiene resins, silicone resins, melamine resins, phenol resins, polyvinyl chloride resins, cellulose resins, alkyd resins, modified cellulose resins, fluorinated resins, polyvinyl butyral resins, epoxy resins, polyamide resins, and the like. It is also possible to use resins obtained by modifying the above-described resins with silicone or fluorine. When a binder resin is used in combination, it may be used or added in a proportion ranging preferably from 5 to 90 parts by mass, more preferably from 10 to 60 parts by mass or so per 100 parts by mass of the polysiloxane-modified polyhydroxy polyurethane resin.

No particular limitation is imposed on the forming method of the heat-resistant protective layer that makes up the thermal recording medium according to the present invention. The heat-resistant protective layer can be formed, for example, by dissolving or dispersing the above-mentioned polysiloxane-modified polyhydroxy polyurethane resin in an appropriate organic solvent, applying the resulting coating formulation by a coating method such as the wire bar method, gravure printing method or screen printing method or by a reverse roll coating method making use of a gravure roll, and drying the resultant coating layer. The drying temperature in the above-described formation may preferably be in a range of from 50 to 100° C. The thickness of the heat-resistant protective layer may be preferably from 0.001 to 2.00 µm, more preferably from 0.05 to 0.7 µm.

As the base material sheet for use in the thermal recording medium according to the present invention, it is possible to use a film of a polycarbonate, polyarylate, polyether-imide, polysulfone, polyphenyl ether, polyamide-imide, polyimide, polyethylene naphthalate, polyphenyl sulfide, polyether-ketone, fluorinated resin, or the like, or a film of polyethylene terephthalate (PET), polybutyleneterephthalate (PBT), polybutylene naphthalate (PBN), polyethylene, polypropylene, polystyrene, polyvinyl chloride, polyvinylidene chloride, a polyamide or the like. A film having biaxial orientation is preferred. From the viewpoint of sensitivity in thermal recording, the thickness of the base material may be in a range that can be specified to be preferably 6 µm and smaller, more preferably from 2.5 µm to 4.5 µm.

As the ink layer in the thermal recording medium according to the present invention, any desired one of conventionally-known ink layers can be used as it is, and no particular limitation is imposed. Described specifically, the ink layer for use in the present invention is formed from a colorant, a wax, a resin, and additives such as a lubricant and surfactant. Usable examples of the colorant include pigments and dyes, such as carbon black, red iron oxide, Lake Red C, benzidine yellow, phthalocyanine green, phthalocyanine blue, direct dyes, oil dyes, and basic dyes. The present invention is, however, not limited to these exemplified compounds. Therefore, not only the above-mentioned illustrative compounds but also the compounds currently used in thermal fusion transfer recording methods or thermal sublimation transfer recording methods and readily available from the market are all usable in the present invention.

As the thermal recording medium according to the present invention uses the above-described polysiloxane-modified polyhydroxy polyurethane resin of the present invention in the resin composition with which the heat-resistant protective layer arranged on the back side of the base material sheet is formed, the polysiloxane segments in the resin orient in the surface of the protective layer. The heat-resistant protective layer so formed is provided with heat resistance, lubricity and non-tackiness to a thermal head, all of which the polysiloxane segments are equipped with. In addition, the hydroxyl groups in the structure of the polysiloxane-modified polyhydroxy polyurethane resin that forms the heat-resistant protective layer strongly interact with the base material sheet at the interface between them, so that the heat-resistant protective layer is provided with excellent adhesiveness to the base material, superb flexibility and outstanding antistatic effect. Therefore, the thermal recording medium can be provided with still better performance. Further, the 5-membered cyclic carbonate polysiloxane compound that makes up the resin for use in the present invention can incorporate carbon dioxide in the resin owing to the use of carbon dioxide as a production raw material. The present invention can, therefore, provide the thermal recording medium as an environment-responsive product, which is also useful from the viewpoint of a reduction in carbon dioxide considered to be a cause of global warming and which is unavailable from conventional products.

<Imitation Leather>

The imitation leather according to the present invention is characterized in that the resin composition, which contains as a principal component the polysiloxane-modified polyhydroxy polyurethane resin of the present invention derived from the reaction between the 5-membered cyclic carbonate polysiloxane compound represented by the formula (1) and the amine compound, is filled in or laminated on the base fabric.

Upon obtaining the imitation leather according to the present invention, the above-described resin composition which contains as a principal component the polysiloxane-modified polyhydroxy polyurethane resin of the present invention is filled in or laminated on the base fabric. The film made of the resin may be used as it is. Using a crosslinking agent, the film can also be formed into a crosslinked film. As the crosslinking agent usable as described above, any crosslinking agent can be used insofar as it reacts with the hydroxyl groups in the resin structure. Examples include alkyl titanate compounds, polyisocyanate compounds, and the like. No particular limitation is imposed on these polyisocyanate compounds insofar as they are known and have been conventionally used in the crosslinking of polyurethane resins. Illustrative are adducts or the like of polyisocyanates, which have such structural formulas as described above, with other compounds.

The resin composition, which is used for the formation of the imitation leather according to the present invention and contains as a principal component the polysiloxane-modified polyhydroxy polyurethane resin of the present invention, can be used as a blend with one or more of conventionally-known various resins to adjust the workability such as impregnation, coating or covering applicability and the hand feeling and various performance of the imitation leather to be obtained. As other resins to be used or blended, those chemically reactable with a crosslinking agent such as the above-described polyisocyanate adduct are preferred, although even resins having no reactivity can be also used in the present invention.

As resins usable in combination with the above-described resin, polyurethane-based resins which have been conventionally used as forming materials for imitation leathers are preferred although no particular limitation is imposed. Usable examples include acrylic resins, polyester resins, polybutadiene resins, silicone resins, melamine resins, phenol resins, phenoxy resins, vinyl chloride resin, vinyl chloride-vinyl acetate resin, cellulose resins, alkyd resins, modified cellulose resins, fluorinated resins, polyvinyl butyral resins, epoxy resins, polyamide resins, and the like. It is also possible to use resins obtained by modifying these resins with silicone or fluorine. When one or more of these resins are used in combination, such a resin or resins may be used in a range of preferably from 5 to 90 parts by mass, more preferably from 10 to 60 parts by mass or so per 100 parts by mass of the polysiloxane-modified polyhydroxy polyurethane resin.

To the resin composition which is used in the present invention and contains as a principal component the polysiloxane-modified polyhydroxy polyurethane resin, one or more of various additives such as antioxidants, ultraviolet absorbers, anti-hydrolysis agents, pigments, dyes, flame retardants and fillers may be added in addition to one or more of the above-described various additives.

The imitation leather according to the present invention is characterized in that the resin composition, which contains as a principal component the above-described polysiloxane-modified polyhydroxy polyurethane resin, is filled in or laminated on the base fabric. No particular limitation is imposed on the production process of the imitation resin according to the present invention, and a known production process of an artificial leather or synthetic leather can be used. In the imitation leather according to the present invention, there is also included one produced by arranging a plasticizer-containing, vinyl chloride resin layer on a base fabric sheet and forming thereon a resin layer composed as a principal component of the polysiloxane-modified polyhydroxy polyurethane resin which characterizes the present invention.

As the base fabric (base material sheet) in the imitation leather according to the present invention, base fabrics (base material sheets) which have been conventionally used in the production of imitation leathers are all usable, and no particular limitation is imposed.

Owing to the use of the specific polysiloxane-modified polyhydroxy polyurethane resin as a principal component in the imitation leather according to the present invention as described above, the imitation leather can be provided with excellent pliability, lubricity, scratch resistance, abrasion resistance and chemical resistance. In addition, the hydroxyl groups which the polysiloxane-modified polyhydroxy polyurethane resin has strongly interact with the base fabric (base material sheet) at the interface between them. It is, therefore, possible to obtain the excellent performance that excellent adhesiveness to the base fabric, superb flexibility and outstanding antistatic effect are imparted, thereby making it possible to provide the imitation leather with improved performance. Further, the 5-membered cyclic carbonate polysiloxane compound that is employed in the synthesis of the resin for use in the present invention can incorporate carbon dioxide in the resin owing to the use of carbon dioxide as a production raw material. The present invention can, therefore, provide the imitation leather as an environment-responsive product, which is also useful from the viewpoint of a reduction in carbon dioxide considered to be a cause of global warming and which is unavailable from conventional products.

<Skin Material Made of Thermoplastic Polyolefin Resin>

The skin material according to the present invention, which is made of the thermoplastic polyolefin resin, has the top coat layer coated and formed directly on the thermoplastic polyolefin resin sheet, or the primer layer coated on the resin layer and the top coat layer coated and formed on the primer layer. This skin material is characterized in that as the high-molecular compound making up the top coat layer, the above-described polysiloxane-modified polyhydroxy polyurethane resin, which has been derived from the reaction between the above-described 5-membered cyclic carbonate polysiloxane compound represented by the formula (1) and the amine compound, is used.

Concerning the skin material according to the present invention, which is made of the thermoplastic polyolefin resin, a matting agent may be added with consideration to anti-glare properties depending on the application upon forming the top coat layer with the polysiloxane-modified polyhydroxy polyurethane resin of the present invention. As the matting agent, a material composed of one fine powder or a combination of two or more fine powders selected from organic fine powders and inorganic fine powders can be used. No particular limitation is imposed on the organic fine powder or powders to be used as described above. Usable examples, however, include acrylic resin particles, styrene resin particles, styrene-acrylic resin particles, phenol resin particles, melamine resin particles, acrylic-polyurethane resin particles, polyurethane resin particles, polyester resin particles, nylon resin particles, silicone resin particles, polyethylene resin particles, and the like. These powders may preferably have an average particle size in a range of from 0.1 to 10 µm. As their shapes, those having a spherical shape or a substantially spherical shape are preferred from a practical standpoint because the resulting coating film can be provided with particularly good matte properties.

On the other hand, the inorganic fine powders include talc, mica, calcium carbonate, barium sulfate, magnesium carbonate, clay, alumina, silica, carbon fibers, glass fibers, metal fibers, carbon black, titanium oxide, molybdenum, magnesium hydroxide, bentonite, graphite, and the like. As these powders, those composed of particles having an average particle size of 10 µm or smaller can conform to the object of the present invention, but the smaller the better.

Such a matting agent as described above may be used in a proportion ranging from 1 to 150 parts by mass, preferably from 3 to 100 parts by mass per 100 parts by mass of the polysiloxane-modified polyhydroxy polyurethane resin. A proportion of smaller than 1 parts by mass cannot bring about sufficient matting effect, while a proportion of greater than 150 parts by mass may provide the resulting coating film with significantly lowered mechanical/physical properties. Proportions outside the above-described range are not preferred accordingly.

The polysiloxane-modified polyhydroxy polyurethane resin for use in the present invention is derived from the reaction between the above-described 5-membered cyclic carbonate polysiloxane compound represented by the formula (1) and the amine compound, and through this reaction, hydroxyl groups are formed. The thus-formed hydroxyl groups bring about further improvements in performance for the skin material according to the present invention, which is made of the thermoplastic polyolefin resin and has the top coat layer formed with the above-described resin. Described specifically, these hydroxyl groups have hydrophilicity. By the hydroxyl groups, the adhesiveness of the top coat layer to the thermoplastic polyolefin resin sheet are hence improved, and the antistatic effect unavailable from the conventional products can also be obtained. Furthermore, the use of the reaction between the hydroxyl groups in the structure of the resin and a crosslinking agent or the like added to the resin can achieve further improvements in the surface scratch resistance, abrasion resistance, chemical resistance and the like of the skin material product made of the thermoplastic polyolefin resin.

In the present invention, the top coat layer can be arranged by forming a film on the thermoplastic polyolefin resin with the composition, which contains as a principal component the polysiloxane-modified polyhydroxy polyurethane resin, or depending on the application, the composition containing the matting agent (these compositions will hereinafter be referred to simply as "the resin composition") as it is. Further, a crosslinked film can be formed by incorporating a crosslinking agent in the resin composition. As the crosslinking agent usable as described above, any crosslinking agent can be used insofar as it reacts with the hydroxyl groups in the resin structure. Examples include alkyl titanate compounds, polyisocyanate compounds, and the like. No particular limitation is imposed on the crosslinking agent insofar as it is a known crosslinking agent employed in the crosslinking of polyurethane resins. Illustrative are adducts or the like of polyisocyanates, which have such structural formulas as exemplified above, with other compounds.

The resin composition for use in the present invention may also contain one or more other resins different from the polysiloxane-modified polyhydroxy polyurethane resin in addition to this resin to improve its spraying applicability or coating applicability to the thermoplastic polyolefin resin and its film-forming property. As such other resins, conventionally-known various binder resins can be used or mixed. As the binder resins, those chemically reactable with the crosslinking agent such as the above-described polyisocyanate adduct or the like are preferred, although even those having no reactivity can be also used in the present invention.

As these binder resins, various binder resins which have been conventionally employed for skins of thermoplastic polyolefin resins can be used, and no particular limitation is imposed. Usable examples include acrylic resins, polyurethane resins, polyester resins, polybutadiene resins, silicone resins, melamine resins, phenol resins, polyvinyl chloride resins, cellulose resins, alkyd resins, modified cellulose resins, fluorinated resins, polyvinyl butyral resins, epoxy resins, polyamide resins, and the like. When a resin composition making combined use of such a binder resin is used, the binder resin may be used in a range of preferably from 5 to 90 parts by mass, more preferably from 10 to 60 parts by mass or so per 100 parts by mass of the polysiloxane-modified polyhydroxy polyurethane resin that characterizes the present invention.

In the resin composition for use in the present invention, one or more of various additives for coating formulations, such as surface control agents, fluidity control agents, ultraviolet absorbers, dispersants and anti-settling agents, may be further added as needed.

As the thermoplastic polyolefin resin sheet that makes up the skin material according to the present invention, one made of one or more of the below-described materials can be used, for example. It is possible to use, for example, a sheet made of at least one resin selected from the group consisting of low-density to high-density polyethylenes (LDPE, LLDPE, HDPE, etc.), polypropylenes such as polypropylene and propylene-ethylene copolymer, and thermoplastic polyolefin resins such as ethylene-propylene rubber (EPR), ethylene-butene rubber (EBR) and ethylene-propylene-diene terpolymers (EPDM). Of these, a sheet made of a polypropylene resin or polyolefin-based thermoplastic elastomer is preferred because it has good pliability and elasticity along with excellent mechanical strength.

The thermoplastic polyolefin resin sheet is inert at the surface thereof, and therefore, is inferior in the adhesiveness with a coating to the surface. It is, therefore, preferred to directly apply the above-mentioned resin composition to form a top coat layer after physically or chemically activating the surface by corona discharge treatment or the like. It is also preferred to apply the above-mentioned resin composition to form a top coat layer via a primer layer after forming the primer layer by applying a chlorinated polyolefin-based resin or polyester-based resin and a polyisocyanate compound or a polyurethane resin and a polyisocyanate compound.

A film can be formed by applying the above-mentioned resin composition on the thermoplastic polyolefin resin sheet directly or via the primer layer in accordance with a known coating method such as brush coating, spray coating, roll coating, gravure coating or dip coating to give a dry coat thickness of from 3 to 20 µm or so, and subsequent to drying, conducting heat treatment at a temperature of from 50 to 120° C. or so. The skin material according to the present invention, which has been formed as a sheet as described above and is made of the thermoplastic polyolefin resin, is formed into a desired shape, for example, by vacuum molding and is provided, for example, as a vehicle interior trim material or an electric home appliance component or part.

In the skin material according to the present invention, which is made of the thermoplastic polyolefin resin, the use of the polysiloxane-modified polyhydroxy polyurethane resin of the present invention as a material for forming its top coat layer provides the surface of the skin material with excellent lubricity, surface touch feeling, scratch resistance, abrasion resistance, chemical resistance, and further, uniform matting effect. In addition, the hydroxyl groups in the resin of the present invention employed for the formation of the top coat layer strongly interact with the base material sheet at the interface between them, thereby making it possible to obtain excellent performance that the skin material is provided with excellent adhesiveness to the base material, superb flexibility and outstanding antistatic effect. Therefore, the skin material made of the thermoplastic polyolefin resin can be provided with improved performance. Further, the 5-membered cyclic carbonate polysiloxane compound employed in the synthesis of the resin for use in the present invention can incorporate and fix carbon dioxide in the resin owing to the use of carbon dioxide as a production raw material. The present invention can, therefore, provide the skin material made of the thermoplastic polyolefin resin as a product of an environment-responsive material, which is also useful from the viewpoint of a reduction in carbon dioxide considered to be a cause of global warming and which is unavailable from conventional products.

<Weather Strip Material>

The weather strip material according to the present invention is a material for coating and/or impregnating a high-molecular elastomer material to form a surface treatment layer at a slide contact portion to be brought into sliding contact with another part, and is characterized in that the weather strip material is a resin composition containing the polysiloxane-modified polyhydroxy polyurethane resin of the present invention derived from the reaction between the above-described 5-membered cyclic carbonate polysiloxane compound represented by the formula (1) and the amine compound.

The weather strip material according to the present invention is the above-described resin composition containing the polysiloxane-modified polyhydroxy polyurethane resin of the present invention, and the surface treatment layer is formed at the slide contact portion to be brought into sliding contact with another part by coating and/or impregnating the high-molecular elastomer material with the resin composition. As a more preferred embodiment of the resin composition, it is possible to mention a resin composition obtained by adding a diorganopolysiloxane, which has an average polymerization degree of from 5,000 to 100,000, and/or a silicone oil, which has a viscosity of from 100 to 1,000 cs, as an additive or additives in a proportion of from 1 to 100 parts by mass per 100 parts by mass of the above-described polysiloxane-modified polyhydroxy polyurethane resin of the present invention.

As the diorganopolysiloxane to be added to the above-described resin, it is preferred to use a linear, non-fluidity, rubbery silicone having an average polymerization degree of from 5,000 to 10,000. Such a material is readily available from the market.

As the silicone oil to be added to the polysiloxane-modified polyhydroxy polyurethane resin of the present invention, one having a viscosity in the range of from 100 to 1,000 cs is preferred. The silicone oil to be used as described above may have or may not have active hydrogen atoms which can react with, for example, a polyisocyanate as a crosslinking agent. It is to be noted that "cs" means "centistokes" as a unit of kinematic viscosity. In general, each silicone oil is commercially sold with this value as a specification criterion.

Such a diorganopolysiloxane and/or silicone oil as mentioned above may be added in a proportion of from 1 to 100 parts by mass, preferably from 3 to 70 parts by mass or so per 100 parts by mass of the polysiloxane-modified polyhydroxy polyurethane resin. A proportion of smaller than 1 parts by mass cannot bring about sufficient effect by the addition, while a proportion of greater than 100 parts by mass tends to provide the resulting coating film with lowered mechanical/physical properties. Proportions outside the above-described range are not preferred accordingly.

As another preferred embodiment of the resin composition, a matting agent may be used as an additive to matt the surface of the resulting treatment layer and to provide the surface of the resulting treatment layer with improved abrasion resistance and lubricity. Described specifically, it is preferred to obtain a resin composition by adding a material, which is composed of one fine powder or a combination of two or more fine powders selected from organic fine powders and inorganic fine powders, as a matting agent in a proportion of from 1 to 150 parts by mass per 100 parts by mass of the resin for use in the present invention.

No particular limitation is imposed on the organic fine powder or powders to be used as described above. Usable examples include acrylic resin particles, styrene resin particles, styrene-acrylic resin particles, phenol resin particles, melamine resin particles, acrylic-polyurethane resin particles, polyurethane resin particles, polyester resin particles, nylon resin particles, silicone resin particles, polyethylene resin particles, and the like. These powders may preferably have an average particle size of from 0.1 to 10 μm or so. As their particle shapes, those having a spherical shape or a substantially spherical shape are preferred from a practical standpoint because the resulting coating film can be provided with particularly good matte properties.

On the other hand, the inorganic fine powders include talc, mica, calcium carbonate, barium sulfate, magnesium carbonate, clay, alumina, silica, carbon fibers, glass fibers, metal fibers, carbon black, titanium oxide, molybdenum, magnesium hydroxide, bentonite, graphite, and the like. As the average particle size of particles that make up these powders, 10 μm or smaller can conform to the object of the present invention, but powders having as smaller a particle size as possible are more preferred.

Such a matting agent may be added in a proportion of from 1 to 150 parts by mass or so, preferably from 3 to 60 parts by mass per 100 parts by mass of the polysiloxane-modified polyhydroxy polyurethane resin. A proportion of smaller than 1 parts by mass cannot bring about the matting effect sufficiently, while a proportion of greater than 150 parts by mass tends to provide the resulting coating film with significantly lowered mechanical/physical properties. Proportions outside the above-described range are not preferred accordingly.

The polysiloxane-modified polyhydroxy polyurethane resin for use in the present invention is derived from the reaction between the above-described 5-membered cyclic carbonate polysiloxane compound represented by the formula (1) and the amine compound. When a surface treatment layer is formed by coating and/or impregnating the high-molecular elastomer material with the material of the present invention containing the resin, the hydroxyl groups formed by the reaction of the 5-membered cyclic carbonate groups in the structure of the resin with the amine compound can, therefore, provide the surface of the high-molecular elastomer with further improved performance. Described specifically, these hydroxyl groups have hydrophilicity and therefore, can significantly improve the adhesiveness to the high-molecular elastomer material, and can also obtain antistatic effect which is unavailable from conventional products. Furthermore, the formation of the surface treatment layer by the use of the reaction between the hydroxyl groups in the resin and a crosslinking agent or the like can achieve further improvements in surface heat resistance, abrasion resistance and chemical resistance of the surface.

In the present invention, the film (surface treatment layer) formed with the resin composition, which contains the polysiloxane-modified polyhydroxy polyurethane resin of the present invention, or the composition, which contains the resin and such various additives as mentioned above, (these compositions will hereinafter be referred to simply as "the resin composition") can bring about sufficient effects as it is. Further, a crosslinked film can be formed by using a crosslinking agent. In this formation, any crosslinking agent can be used insofar as it reacts with the hydroxyl groups in the structure of the resin, and no particular limitation is imposed. Examples include alkyl titanate compounds and polyisocyanate compounds. Preferred are crosslinking agents which are known and have been conventionally employed in the crosslinking of polyurethane resins. Illustrative are adducts or the like of polyisocyanates, which have such structural formulas as exemplified above, with other compounds.

In the resin composition containing the polysiloxane-modified polyhydroxy polyurethane resin according to the present invention, any desired one or more of conventionally-known various binder resins can be used or mixed to provide improved adhesiveness and film-forming property when the resin composition is applied to a high-molecular elastomer material as a base material of a weather strip to form a surface treatment layer. As the binder resin or resins to be used as described above, those chemically reactable with a crosslinking agent such as the above-described polyisocyanate adduct are preferred, although even those having no reactivity can be also used in the present invention.

As these binder resins, binder resins which have been conventionally employed in the surface treatment of weather strips can be used, and no particular limitation is imposed. Usable examples include acrylic resins, polyurethane resins, polyester resins, polybutadiene resins, silicone resins, melamine resins, phenol resins, polyvinyl chloride resins, cellulose resins, alkyd resins, modified cellulose resins, fluorinated resins, polyvinyl butyral resins, epoxy resins, polyamide resins, and the like. When one or more of these binder resins are used in combination, the binder resin or resins may be used or added in a proportion of preferably from 5 to 90 parts by mass, more preferably from 10 to 60 parts by mass or so per 100 parts by mass of the resin composition used in the present invention.

To the resin composition for use in the present invention, one or more of various coating additives such as surface control agents, fluidity control agents, ultraviolet absorbers, dispersants and anti-settling agents may be added as needed.

By coating and/or impregnating the high-molecular elastomer as a weather strip base material with the resin composition, which contains the polysiloxane-modified hydroxyl polyurethane resin of the present invention, in accordance with a known coating method such as brush coating, spray coating, roll coating, gravure coating or dip coating, a surface treatment layer can be formed on the base material at a desired position thereof. Upon conducting the above-described formation, it is preferred to form the film by applying the above-described resin composition on the high-molecular elastomer to give a dry coat thickness of from 10 to 100 μm or so, and subsequent to drying, conducting heat treatment at a temperature of from 50 to 150° C. or so.

By forming the surface treatment layer on the high-molecular elastomer at the desired position thereof with the resin composition that contains the polysiloxane-modified polyhydroxy polyurethane resin of the present invention as described above, a weather strip excellent in lubricity, abrasion resistance, heat resistance and weatherability, and in a preferred embodiment, also in uniform matting effect can be obtained. In addition, the hydroxyl groups in the structure of the polysiloxane-modified polyhydroxy polyurethane resin strongly interact with the high-molecular elastomer as the base material at the interface between them, so that the thus-formed surface treatment layer is provided with excellent adhesiveness to the base material, superb flexibility and outstanding antistatic effect. Therefore, the weather strip obtained by forming its surface treatment layer with the material of the present invention is provided with excellent performance. Further, the polysiloxane-modified polyhydroxy polyurethane resin for use in the present invention can incorporate carbon dioxide in the resin because the specific 5-membered cyclic carbonate polysiloxane compound used in the synthesis of the resin has been obtained by reacting an epoxy-modified polysiloxane compound and carbon dioxide. This means that the present invention makes it possible to provide a weather strip, which is responsive to the preservation of the environment, useful also from the viewpoint of a reduction in greenhouse gas, and unavailable from conventional products.

EXAMPLES

The present invention will next be described in further detail based on specific production examples, examples and comparative examples, although the present invention shall not be limited to these examples. It is to be noted that the terms "parts" and "%" in the following examples are on a mass basis unless otherwise specifically indicated.

[Polysiloxane-Modified Polyhydroxy Polyurethane Resin]

Production Example 1

Production of 5-Membered Cyclic Carbonate Polysiloxane Compound

To a reaction vessel equipped with a stirrer, thermometer, gas inlet tube and reflux condenser, a divalent epoxy-modified polysiloxane represented the below-described formula (A) (100 parts), N-methylpyrrolidone (100 parts) and sodium iodide (1.2 parts) were added, followed by stirring into a homogeneous solution. Subsequently, the solution was stirred under heating at 80° C. for 30 hours while bubbling carbon dioxide gas at a rate of 0.5 L/min. The divalent epoxy-modified polysiloxane used as described above was "X-22-163" (product of Shin-Etsu Chemical Co., Ltd.; epoxy equivalent: 198 g/mol), and its infrared spectrum is shown in FIG. 1.

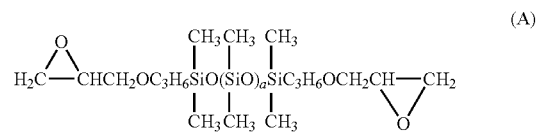

(a: Value to give a molecular weight of 396)

After completion of the reaction, n-hexane (100 parts) was added to the resultant reaction mixture to dilute it. The diluted reaction mixture was then washed three times with purified water (80 parts each time) in a separatory funnel to eliminate N-methylpyrrolidone and sodium iodide. The resulting n-hexane solution was then dried with magnesium sulfate, and was then concentrated to obtain, as a colorless clear liquid, a 5-membered cyclic carbonate polysiloxane compound (1-A) (92 parts, yield: 89.7%).

Figure 2:
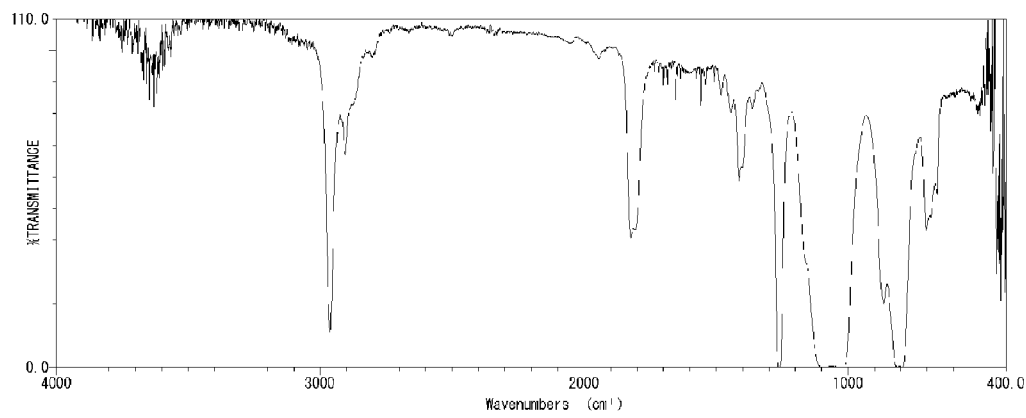
FIG. 2 is an infrared absorption spectrum of a 5-membered cyclic carbonate polysiloxane.

In an infrared absorption spectrum ("FT-720", manufactured by Horiba, Ltd.) of the thus-obtained reaction product (1-A), there was observed an absorption around 1,800 cm$^{-1}$ as seen FIG. 2. This absorption is attributable to the carbonyl groups in the cyclic carbonate groups, and is not found on the raw material. The number average molecular weight of the reaction product was 2,450 (polystyrene equivalent; "GPC-8220", manufactured by Tosoh Corporation) as shown in FIG. 3. In the thus-obtained 5-membered cyclic carbonate polysiloxane compound (1-A), carbon dioxide was fixed as much as 18.1%.

Production Example 2

Production of 5-Membered Cyclic Carbonate Polysiloxane Compound

In this production example, a divalent epoxy-modified polysiloxane B represented by the below-described formula (B) ("KF-105", product of Shin-Etsu Chemical Co., Ltd.; epoxy equivalent: 485 g/mol) was used in place of the divalent epoxy-modified polysiloxane (A) used above in Production Example 1. By conducting a reaction as in Production Example 1 except for the above-described change, a 5-membered cyclic carbonate polysiloxane compound (1-B) (99 parts, yield: 91%) was obtained as a colorless clear liquid. The thus-obtained reaction product (1-B) was identified by infrared absorption spectroscopy, GPC and NMR as in Production Example 1. In the thus-obtained 5-membered cyclic carbonate polysiloxane compound (1-B), carbon dioxide was fixed as much as 8.3%.

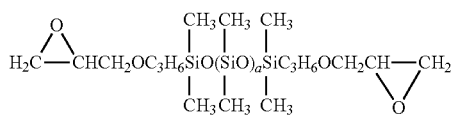

(B)

(a: Value to give a molecular weight of 970)

Production Example 3

Production of 5-Membered Cyclic Carbonate Polysiloxane Compound

In this production example, a divalent epoxy-modified polysiloxane C represented by the below-described formula (C) ("X-22-169AS", product of Shin-Etsu Chemical Co., Ltd.; epoxy equivalent: 533 g/mol) was used in place of the divalent epoxy-modified polysiloxane (A) used above in Production Example 1. By conducting a reaction as in Production Example 1 except the above-described change, a 5-membered cyclic carbonate polysiloxane compound (1-C) (71 parts, yield: 68%) was obtained as a colorless clear liquid. The thus-obtained reaction product was identified by infrared absorption spectroscopy, GPC and NMR as in Production Example 1. In the thus-obtained 5-membered cyclic carbonate polysiloxane compound (1-C), carbon dioxide was fixed as much as 7.6%.

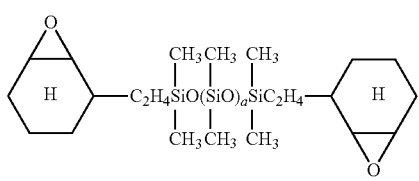

(C)

(a: Value to give a molecular weight of 1,066)

Comparative Production Example 1

Production of 5-Membered Cyclic Carbonate Compound

In this comparative production example, a divalent epoxy compound D represented by the below-described formula (D) ("EPICOAT 828", product of Japan Epoxy Resin Co., Ltd.; epoxy equivalent: 187 g/mol) was used in place of the divalent epoxy-modified polysiloxane (A) used above in Production Example 1. By conducting a reaction as in Production Example 1 except for the above-described change, a 5-membered cyclic carbonate compound (1-D) (118 parts, yield: 95%) was obtained as a white powder.

The reaction product was identified by infrared absorption spectroscopy, GPC and NMR. In the thus-obtained 5-membered cyclic carbonate compound (1-D), carbon dioxide was fixed as much as 19%.

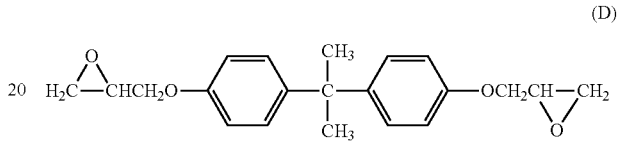

(D)

Examples 1 to 3

Production of Polysiloxane-Modified Polyhydroxy Polyurethane Resins

Reaction vessels which were each equipped with a stirrer, thermometer, gas inlet tube and reflux condenser were purged with nitrogen. To the reaction vessels, the 5-membered cyclic carbonate polysiloxane compounds obtained above in Production Examples 1 to 3 were added respectively. To each reaction vessel, N-methylpyrrolidone was added further to adjust a solids content to 35%, followed by stirring into a homogeneous solution. The corresponding amine compound described in Table 1 was then added in the predetermined equivalent amount. The resulting mixture was stirred at a temperature of 90° C. for 10 hours so that a reaction was conducted until the amine compound was no longer detected.

The three kinds of polysiloxane-modified polyhydroxy polyurethane resins of Examples 1 to 3 obtained as described above had properties as shown in Table 1.

Comparative Example 1

Production of Polyhydroxy Polyurethane Resin

A reaction vessel equipped with a stirrer, thermometer, gas inlet tube and reflux condenser was purged with nitrogen. To the reaction vessel, the 5-membered cyclic carbonate compound obtained above in Comparative Production Example 1 was added. To the reaction vessel, N-methylpyrrolidone was added further to adjust a solids content to 35%, followed by stirring into a homogeneous solution. Hexamethylenediamine was then added in a predetermined equivalent amount. The resulting mixture was stirred at a temperature of 90° C. for 10 hours so that a reaction was conducted until the amine compound was no longer detected. The thus-obtained polyhydroxy polyurethane resin, which was free of polysiloxane segments, had properties as shown in Table 1.

TABLE 1

Compositions and Physical Properties of Polyhydroxy Polyurethane Resins

|  | Example 1 | Example 2 | Example 3 | Comp. Ex. 1 |
|---|---|---|---|---|
| Carbonate compound (i) | 1-A | 1-B | 1-C | 1-D |
| Amine compound (ii) | HMDA[1)] | BAPP[2)] | XDA[3)] | HMDA[1)] |
| Molar ratio (i/ii) | 1.0 | 1.0 | 1.0 | 1.0 |
| Solution viscosity (35% conc., MPa·s) | 1.5 | 1.8 | 1.1 | 1.3 |
| Number average molecular weight | 38,000 | 43,000 | 31,000 | 35,000 |
| Hydroxyl number (mg KOH/g) | 175 | 83 | 76 | 215 |
| Polysiloxane content (%) | 32 | 57 | 62 | 0 |
| Breaking strength (20° C., MPa) | 32.1 | 23.8 | 35.2 | 21.1 |
| Breaking extension (20° C., %) | 15 | 83 | 50 | 15 |
| Surface resistance (20° C. × 46% RH, Ω) | $5.6 \times 10^{12}$ | $2.8 \times 10^{13}$ | $8.2 \times 10^{13}$ | $7.6 \times 10^{10}$ |
| Fixed amount of carbon dioxide (%)[4)] | 14.5 | 6.9 | 6.8 | 15.2 |

[1)]Hexamethylenediamine
[2)]Bis-aminopropylpiperazine
[3)]Xylylenediamine
[4)]Calculated value Comparative Example 2

Production of Polyester Urethane Resin

A conventional polyurethane resin of Comparative Example 2 was synthesized from a polyester, diol and diamine as will be described below. A reaction vessel equipped with a stirrer, thermometer, gas inlet tube and reflux condenser was purged with nitrogen. In the reaction vessel, polybutylene adipate (average molecular weight: approx. 2,000; 150 parts) and 1,4-butanediol (15 parts) were dissolved in a mixed organic solvent consisting of methyl ethyl ketone (200 parts) and dimethylformamide (50 parts). Subsequently, under thorough stirring at 60° C., a solution of hydrogenated MDI (62 parts) in dimethylformamide (171 parts) was gradually added dropwise, and after completion of the dropwise addition, a reaction was conducted at 80° C. for 6 hours.

The reaction mixture had a viscosity of 3.2 MPa·s (25° C.) at a solids content of 35%. A film obtained from the reaction mixture had a breaking strength of 45 MPa, a breaking extension of 480%, and a thermal softening temperature of 110° C.

Comparative Example 3

Production of Polysiloxane-Modified Polyurethane Resin

A conventional, polysiloxane-modified polyurethane resin of Comparative Example 3 was synthesized from a diol and diamine as will be described below. Described specifically, a polydimethylsiloxane diol represented by the below-described formula (E) (average molecular weight: approx. 3,200; 150 parts) and 1,4-butanediol (10 parts) were added to a mixed organic solvent consisting of methyl ethyl ketone (200 parts) and dimethylformamide (50 parts), and a solution of hydrogenated MDI (40 parts) in dimethylformamide (120 parts) was gradually added dropwise. After completion of the dropwise addition, a reaction was conducted at 80° C. for 6 hours. The reaction mixture had a viscosity of 1.6 MPa·s (25° C.) at a solids content of 35%. A film obtained from the reaction mixture had a breaking strength of 21 MPa, a breaking extension of 250%, and a thermal softening temperature of 135° C.

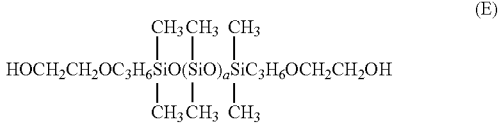

(a: Value to give a molecular weight of 3,200)

[Thermal Recording Media]

Examples 4 to 9 & Comparative Examples 4 to 9

Formation of Heat-Resistant Protective Layers

Separately using the respective polyurethane resin solutions (solids content: 35%) prepared above in Examples 1 to 3 and Comparative Example 1 to 3, heat-resistant protective layers were formed on surfaces of base material sheets, respectively. Described specifically, the above-described resin solutions were diluted with a solvent to give a dry coat thickness of 0.2 μm, to which a crosslinking agent was added as needed to obtain coating formulations (resin compositions) the basic compositions of which are shown in Table 2. The formulations were applied onto surfaces of polyethylene terephthalate films (products of Toray Industries, Inc., thickness: 3.5 μm) by gravure printing, and were dried in a drier to form heat-resistant protective layers on the surfaces of the base material sheets, respectively. Further, thermal recording layers (transfer ink layers) were formed on back sides of the base material films (sheets), said back sides being the sides opposite to the thus-formed heat-resistant protective layers, whereby thermal recording media of Examples 4 to 9 and Comparative Examples 4 to 9 were produced, respectively. The formation of the transfer ink layers will be described subsequently herein.

TABLE 2

Basic Compositions of Respective Coating Formulations (parts)

| Example 4 | Resin of Ex. 1/crosslinking agent[5)] = 100/0 |
|---|---|
| Example 5 | Resin of Ex. 1/crosslinking agent = 100/5 |
| Example 6 | Resin of Ex. 2/crosslinking agent = 100/0 |
| Example 7 | Resin of Ex. 2/crosslinking agent = 100/5 |
| Example 8 | Resin of Ex. 3/crosslinking agent = 100/0 |
| Example 9 | Resin of Ex. 3/crosslinking agent = 100/5 |

TABLE 2-continued

Basic Compositions of Respective Coating Formulations (parts)

| | |
|---|---|
| Comp. Ex. 4 | Resin of Comp. Ex. 1/crosslinking agent = 100/0 |
| Comp. Ex. 5 | Resin of Comp. Ex. 1/crosslinking agent = 100/5 |
| Comp. Ex. 6 | Resin of Comp. Ex. 2/crosslinking agent = 100/0 |
| Comp. Ex. 7 | Resin of Comp. Ex. 2/crosslinking agent = 100/5 |
| Comp. Ex. 8 | Resin of Comp. Ex. 3/crosslinking agent = 100/0 |
| Comp. Ex. 9 | Resin of Comp. Ex. 3/crosslinking agent = 100/5 |

[5] Polyisocyanate ("COLONATE L", product of Nippon Polyurethane Industry Co., Ltd.)

Comparative Example 10

A silicone resin ("KS-841", product of Shin-Etsu Chemical Co., Ltd.; 100 parts) and a catalyst ("PL-7", product of Shin-Etsu Chemical Co., Ltd.; 1 parts) were dissolved in toluene (1,000 parts) to prepare a silicone-based coating formulation of this comparative example. In a similar manner as described above, the coating formulation was then applied onto a base sheet to form a heat-resistant protective layer. Further, a thermal recording layer (transfer ink layer) was formed on a back side of the base material film (sheet), said back side being the side opposite to the heat-resistant protective layer, whereby a thermal recording medium was produced.

(Formation of Transfer Ink Layers)

On the back sides of the polyethylene terephthalate films, said back sides being opposite to the sides having the heat-resistant protective layers obtained as described above, transfer ink layers were formed to obtain the respective thermal recording media of Examples 4 to 9 and Comparative Examples 4 to 10. Described specifically, an ink formulation of the below-described composition was heated to 100° C., and by a roll coating method making use of the resultant hot melt, was applied onto the back sides of the polyethylene terephthalate films, said back sides being opposite to the sides having the heat-resistant protective layers, to give a wet coat thickness of 5 µm, whereby transfer ink layers were formed. In the manner as described above, the thermal recording media of Examples 4 to 9 and Comparative Examples 4 to 10, which used the resins of the corresponding Examples and Comparative Examples, were obtained, respectively.

(Ink Formulation)

| | |
|---|---|
| Paraffin wax | 10 parts |
| Carnauba wax | 10 parts |
| Polybutene | 1 parts |
| (product of Nippon Oil Corp.) | |
| Carbon black | 2 parts |

Evaluation

Using the respective film-shaped thermal recording media obtained as described above, an on-machine thermal recording test was performed by printing them under the below-described printing conditions. The "heat-resistant protective layer" formed on the back side of each thermal recording medium was then evaluated by ranking its sticking tendency, thermal head smearing tendency, adhesiveness to the base material, coefficient of static friction, electrostatic charging properties, and environmental responsiveness. The ranking results are collectively shown in Table 3.

(Printing Conditions for on-Machine Test of Thermal Recording Media)

Printer: "100XI III PLUS" (manufactured by Zebra Technologies Corporation)

Thermal head: "KPA-106-12TA(FLAT)" (manufactured by Kyocera Corporation)

Printing energy: 25 mJ/mm$^2$

Printing speed: 100 mm/sec

Platen pressure: 350 gf/cm

Receiving paper: Cast-coated paper (product of Lintec Corporation)

Print pattern: CODE39 vertical bar code under printing conditions of 30 mm code width and approx. 40 mm length (Sticking Tendency)

Sticking tendency was ranked by visually observing the separability of the "heat-resistant protective layer" of each thermal recording medium from a thermal head upon pressing operation of the thermal recording medium against the thermal recording head when the thermal recording medium was subjected to the on-machine test. As ranking standards, the sticking tendency of the thermal recording medium was relatively ranked in 5 stages, one having best separability receiving "5", while one having worst separability receiving "1".

(Thermal Head Smearing Tendency)

The smearing of the thermal head was ranked by visually observing the state of smear of the thermal head after each thermal recording medium was subjected to an on-machine thermal recording test. As ranking standards, the thermal head smearing tendency of the thermal recording medium was relatively ranked in 5 stages, one causing least smear receiving "5", while one causing severest smear receiving "1".

(Adhesiveness)

As an adhesiveness test, a 10×10 cross-cut cellophane tape peeling test was conducted on the heat-resistant protective layer of each thermal recording medium. The adhesiveness of the thermal recording medium was ranked based on the number of squares remaining after peeling.

(Coefficient of Static Friction)

With respect to the heat-resistant protective layer of each thermal recording medium, its coefficient of static friction was measured by using a surface property tester (manufacture by Shinto Scientific Co., Ltd.).

(Blocking Tendency, Environmental Responsiveness)

By abruptly unrolling each film(sheet)-shaped thermal recording medium from the state of a roll, the blocking tendency between rolled layers of the film by generated static electricity was visually observed. The blocking tendency of the thermal recording medium was ranked "B" when blocking occurred or "A" when no blocking occurred. The environmental responsiveness was ranked "A" or "B" depending on whether or not carbon dioxide was fixed in the resin with which each "heat-resistant protective layer" was formed.

TABLE 3

Ranking Results of Thermal Recording Media

| | Sticking tendency | Head smearing tendency | Adhesiveness | Coefficient of friction | Electrostatic charging properties | Environmental responsiveness |
|---|---|---|---|---|---|---|
| Example 4 | 5 | 5 | 100/100 | 0.123 | A | A |
| Example 5 | 5 | 5 | 100/100 | 0.105 | A | A |
| Example 6 | 5 | 5 | 100/100 | 0.115 | A | A |
| Example 7 | 5 | 5 | 100/100 | 0.101 | A | A |
| Example 8 | 5 | 5 | 100/100 | 0.120 | A | A |
| Example 9 | 5 | 5 | 100/100 | 0.100 | A | A |
| Comp. Ex. 4 | 1 (not traveled) | — | 100/100 | 0.512 | A | A |
| Comp. Ex. 5 | 1 (not traveled) | — | 100/100 | 0.410 | A | A |
| Comp. Ex. 6 | 1 (not traveled) | — | 0/100 | 0.612 | B | B |
| Comp. Ex. 7 | 1 (not traveled) | — | 0/100 | 0.522 | B | B |
| Comp. Ex. 8 | 5 | 5 | 100/100 | 0.133 | B | B |
| Comp. Ex. 9 | 5 | 5 | 100/100 | 0.110 | B | B |
| Comp. Ex. 10 | 5 | 1 | 100/100 | 0.122 | B | B |

[Imitation Leathers]

Examples 10 to 15 & Comparative Examples 11 to 16

Polymerization Examples 1-1, 2-1, 3-1

Polysiloxane-Modified Polyhydroxy Polyurethane Resins

Separately using the 5-membered cyclic carbonate polysiloxane compounds obtained above in Production Examples 1 to 3, polysiloxane-modified polyhydroxy polyurethane resins for use in the examples were synthesized by such a procedure as will be described below. A reaction vessel equipped with a stirrer, thermometer, gas inlet tube and reflux condenser was purged with nitrogen. To the reaction vessel, the 5-membered cyclic carbonate polysiloxane compound obtained in each Production Example 1, 2 or 3 was added. To the reaction vessel, dimethylformamide was added further to adjust a solids content to 35%, followed by stirring into a homogeneous solution. The corresponding amine compound described in Table 4 was then added in a predetermined amount. The resulting mixture was stirred at a temperature of 90° C. for 10 hours so that a reaction was conducted until the amine compound was no longer detected. The three kinds of polysiloxane-modified polyhydroxy polyurethane resins obtained as described above will be designated as "Polymerization Example 1-1", "Polymerization Example 2-1" and "Polymerization Example 3-1", and their properties were as shown in Table 4.

Comparative Polymerization Example 1-1

Production of Polyhydroxy Polyurethane Resin

A polyhydroxy polyurethane resin for use in the comparative example was synthesized as will be described below. A reaction vessel equipped with a stirrer, thermometer, gas inlet tube and reflux condenser was purged with nitrogen. To the reaction vessel, the 5-membered cyclic carbonate compound obtained in Comparative Production Example 1 was added. To the reaction vessel, dimethylformamide was added further to adjust a solids content to 35%, followed by stirring into a homogeneous solution. Hexamethylenediamine was then added in a predetermined amount. The resulting mixture was stirred at a temperature of 90° C. for 10 hours so that a reaction was conducted until the amine compound was no longer detected. The resultant polyhydroxy polyurethane resin had properties as shown in Table 4.

TABLE 4

Compositions and Physical Properties of Polyhydroxy Polyurethane Resins

| | Polymerization Example 1-1 | Polymerization Example 2-1 | Polymerization Example 3-1 | Comp. Polymerization Example 1-1 |
|---|---|---|---|---|
| Carbonate compound (i) | 1-A | 1-B | 1-C | 1-D |
| Amine compound (ii) | HMDA[1] | BAPP[2] | XDA[3] | HMDA[1] |
| Molar ratio (i/ii) | 1.0 | 1.0 | 1.0 | 1.0 |
| Solution viscosity (35% conc., MPa · s) | 1.5 | 1.8 | 1.1 | 1.3 |
| Number average molecular weight | 38,000 | 43,000 | 31,000 | 35,000 |
| Hydroxyl number (mgKOH/g) | 175 | 83 | 76 | 215 |
| Polysiloxane content (%) | 32 | 57 | 62 | 0 |
| Breaking strength (20° C., MPa) | 32.1 | 23.8 | 35.2 | 21.1 |
| Breaking extension (20° C., %) | 15 | 83 | 50 | 15 |

TABLE 4-continued

Compositions and Physical Properties of Polyhydroxy Polyurethane Resins

|  | Polymerization Example 1-1 | Polymerization Example 2-1 | Polymerization Example 3-1 | Comp. Polymerization Example 1-1 |
|---|---|---|---|---|
| Surface resistance (20° C. × 46% RH, Ω) | $5.6 \times 10^{12}$ | $2.8 \times 10^{13}$ | $8.2 \times 10^{13}$ | $7.6 \times 10^{10}$ |
| Fixed amount of carbon dioxide (%)[4] | 14.5 | 6.9 | 6.8 | 15.2 |

[1] Hexamethylenediamine
[2] Bis-aminopropylpiperazine
[3] Xylylenediamine
[4] Calculated value Comparative Polymerization Example 2-1

Production of Polyester Urethane Resin

A conventional polyurethane resin was synthesized as Comparative Polymerization Example 2-1 from a polyester, diol and diamine as will be described below. A reaction vessel equipped with a stirrer, thermometer, gas inlet tube and reflux condenser was purged with nitrogen. In the reaction vessel, polybutylene adipate having an average molecular weight of approx. 2,000 (150 parts) and 1,4-butanediol (15 parts) were dissolved in a solvent consisting of dimethylformamide (250 parts). Subsequently, a solution of hydrogenated MDI (62 parts) in dimethylformamide (171 parts) was gradually added dropwise at 60° C. under thorough stirring, and after completion of the dropwise addition, a reaction was conducted at 80° C. for 6 hours.

The reaction mixture had a viscosity of 3.2 MPa·s (25° C.) at a solids content of 35%. A film obtained from the reaction mixture had a breaking strength of 45 MPa, a breaking extension of 480%, and a thermal softening temperature of 110° C.

Comparative Polymerization Example 3-1

Production of Polysiloxane-Modified Polyurethane Resin

A polysiloxane-modified polyurethane resin for use in this comparative example was synthesized from the below-described diol and diamine as will be described below. A polydimethyl siloxane diol represented by the below-described formula (E) and having an average molecular weight of approx. 3,200 (150 parts) and 1,4-butanediol (10 parts) were added to dimethylformamide solvent (250 parts). Further, a solution of hydrogenated MDI (40 parts) in dimethylformamide (120 parts) was gradually added dropwise, and after completion of the dropwise addition, a reaction was conducted at 80° C. for 6 hours. The reaction mixture had a viscosity of 1.6 MPa·s (25° C.) at a solids content of 35%. A film obtained from the reaction mixture had a breaking strength of 21 MPa, a breaking extension of 250%, and a thermal softening temperature of 135° C.

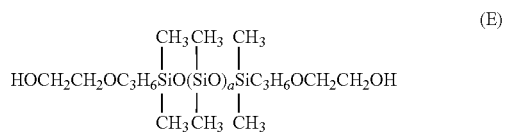

(E)

(a: Value to give a molecular weight of 3,200)

(Production of Imitation Leathers)

Separately using the reaction mixtures (solids content: 35%) of Polymerization Examples 1-1, 2-1 and 3-1 and Comparative Polymerization Examples 1-1, 2-1 and 3-1, coating formulations for imitation leathers were prepared in accordance with the corresponding compositions described in Tables 5 and 6. Artificial leathers and synthetic leathers were produced with the coating formulations, respectively, and were ranked by methods to be described subsequently herein.

Examples 10 to 12 & Comparative Examples 11 to 13

(Artificial Leathers)

Using coating formulations for imitation leathers, said coating formulations containing the resins of Polymerization Examples 1-1, 2-1 and 3-1 and Comparative Polymerization Examples 1-1, 2-1 and 3-1, respectively, nonwoven fabrics made of polystyrene-polyester fibers were coated to give a thickness of 1 mm. The thus-coated non-woven fabrics were immersed in a 10% aqueous solution of DMF controlled at 25° C., so that the resins were solidified. After washing, drying was conducted under heat to obtain artificial leathers having porous layers as sheets.

Examples 13 to 15 & Comparative Examples 14 to 16

(Synthetic Leathers)

A base fabric sheet for imitation leathers was prepared by coating and drying a solution of a polyurethane-based resin ("LETHAMINE UD-602S", trade name, product of Dainichiseika Color & Chemicals Mfg., Co., Ltd.) as an adhesive layer on a woven fabric to give a dry coat thickness of 10 µm. On the other hand, the coating formulations, which contained the resins obtained in Polymerization Examples 1-1, 2-1 and 3-1 and Comparative Polymerization Examples 1-1, 2-1 and 3-1, were separately coated and dried on sheets of release paper to form films of approx. 15 µm thickness, respectively. The thus-obtained films were bonded to cut pieces of the base fabric sheet to obtain synthetic leathers, respectively.

Evaluation

The respective imitation leathers obtained as artificial leathers and synthetic leathers as described above were used. They were ranked by the below-described methods and standards to evaluate the imitation leathers. The ranking results are collectively shown in Tables 5 and 6.

(Hand Feeling)

The hand feeling of each imitation leather was determined by a hand touch feeling, and was ranked in accordance with the following standards.

A: Soft
B: A little hard
C: Hard
(Coefficient of Friction)

The coefficient of friction of the surface of each artificial leather obtained as described above was measured by using the surface property tester (manufacture by Shinto Scientific Co., Ltd.).

(Chemical Resistance)

Onto the surface of each synthetic leather obtained as described above, toluene was dropped. For allowing the surface to always remain in a wet state, the solvent was additionally dropped. One hour later, the solvent was wiped off. A portion of the synthetic leather, where the dropped solvent had been wiped off, was visually observed, and the chemical resistance of the synthetic leather was ranked in accordance with the following standards.

A: No trace of dropping was observed at all on the coated surface.
  B: A slight trace of dropping was recognized, but it was not noticeable.
  C: A clear trace of dropping was recognized.

(Surface Abrasion Resistance)

Using a plane abrasion tester, each synthetic leather obtained as described above was rubbed by reciprocating No. 6 canvas under a load of 1 kgf. The number of reciprocations until occurrence of a scratch was counted.

A: 5,000 reciprocations or more
  B: 2,000 reciprocations or more, but less than 5,000 reciprocations
  C: Less than 2,000 reciprocations (Environmental Responsiveness)

The environmental responsiveness of each imitation leather was ranked "A" or "B" depending on whether or not carbon dioxide was fixed in the used resin.

TABLE 5

Compositions of Coating Formulations and Ranking Results (Artificial Leathers)

(unit: parts)

| | Examples | | | Comparative Examples | | |
|---|---|---|---|---|---|---|
| | 10 | 11 | 12 | 11 | 12 | 13 |
| Resin of Polymerization Example 1-1 | 100 | — | — | — | — | — |
| Resin of Polymerization Example 2-1 | — | 100 | — | — | — | — |
| Resin of Polymerization Example 3-1 | — | — | 100 | — | — | — |
| Resin of Comparative Polymerization Example 1-1 | — | — | — | 100 | — | — |
| Resin of Comparative Polymerization Example 2-1 | — | — | — | — | 100 | — |
| Resin of Comparative Polymerization Example 3-1 | — | — | — | — | — | 100 |
| Hand feeling | A | A | A | B | A | A |
| Coefficient of friction | 0.153 | 0.174 | 0.162 | 0.378 | 0.507 | 0.155 |
| Environmental responsiveness | A | A | A | A | B | B |

TABLE 6

Compositions of Coating Formulations and Ranking Results (Synthetic Leathers)

(unit: parts)

| | Examples | | | Comparative Examples | | |
|---|---|---|---|---|---|---|
| | 13 | 14 | 15 | 14 | 15 | 16 |
| Resin of Polymerization Example 1-1 | 100 | — | — | — | — | — |
| Resin of Polymerization Example 2-1 | — | 50 | — | — | — | — |
| Resin of Polymerization Example 3-1 | — | — | 50 | — | — | — |
| Resin of Comparative Polymerization Example 1-1 | — | — | — | 100 | — | — |
| Resin of Comparative Polymerization Example 2-1 | — | 50 | — | — | 100 | — |
| Resin of Comparative Polymerization Example 3-1 | — | — | 50 | — | — | 100 |
| Crosslinking agent | 3 | 3 | 3 | 3 | 3 | 3 |
| Hand feeling | A | A | A | B | A | A |
| Chemical resistance | A | A | A | A | B | B |
| Surface abrasion resistance | A | A | A | A | C | A |
| Environmental responsiveness | A | A | A | A | B | B |

Crosslinking agent in the table: "COLONATE HX", trade name, product of Nippon Polyurethane Industry Co., Ltd.)

Separately using the polyurethane resins of Examples 1 to 3 and Comparative Examples 1-3 prepared as described above, synthetic leathers and artificial leathers were produced in a similar manner as described above and were ranked likewise. Similar results as described above were obtained.

[Skin Materials Made of Thermoplastic Polyolefin Resins]

Examples 16 to 21 & Comparative Examples 17 to 22

(Used Polyurethane Resins)

In Examples 16 to 21, the polysiloxane-modified polyhydroxy polyurethane resins, which were obtained in Polymerization Examples 1-1, 2-1 and 3-1 and were used for the production of imitation leathers as described above, were used. In Comparative Examples 17 and 18, the polyhydroxy polyurethane resin of Comparative Polymerization Example 1-1 used above for the production of imitation leathers was used. In Comparative Examples 19 and 20, there was used a polyester urethane resin solution produced in a similar manner as in the production of the polyester urethane resin of Comparative Polymerization Example 2-1, which was conducted above upon production of imitation leathers, except that a mixed organic solvent consisting of methyl ethyl ketone (200 parts) and dimethylformamide (50 parts) was used in place of the solvent consisting of dimethylformamide (250 parts). The solution had a viscosity of 3.2 MPa·s (25° C.) at a solids content of 35%. A film obtained from the solution had a breaking strength of 45 MPa, a breaking extension of 480%, and a thermal softening temperature of 110° C. In Comparative Examples 21 and 22, there was used a polysiloxane-modified polyurethane resin solution produced in a similar manner as in the production of the polysiloxane-modified polyurethane resin of Comparative Polymerization Example 3-1, which was conducted above upon production of imitation leathers, except that a mixed organic solvent consisting of methyl ethyl ketone (200 parts) and dimethylformamide (50 parts) was used in place of the solvent consisting of dimethylformamide (250 parts). The solution had a viscosity of 1.6 MPa·s (25° C.) at a solids content of 35%. A film obtained from the solution had a breaking strength of 21 MPa, a breaking extension of 250%, and a thermal softening temperature of 135° C.

(Production of Skin Materials Made of Thermoplastic Polyolefin Resins)

Separately using the above-described polyurethane resins, coating formulations for skins, the principal compositions of which are described in Tables 7 and 8, were prepared. With those coating formulations, skin materials made of thermoplastic polyolefin resins were produced as will be described below. The thus-obtained, respective skin materials were ranked by the following methods and standards.

A base material sheet of a thermoplastic polyolefin was subjected to corona discharge treatment to activate its surface to a wetting index of 45 dyn/cm. Onto the resulting base material sheet, chlorinated polypropylene ("SUPER-CHLON", product of Nippon Paper Chemicals Co., Ltd.) was coated by a 120-mesh gravure roll to give a dry coat thickness of 3 μm, followed by drying at 100° C. for 2 minutes to form a primer layer. Onto cut pieces of the thus-formed coating film, the coating formulations for skins as described in Tables 7 and 8 were applied, respectively, by a 120-mesh gravure roll to give a dry coat thickness of 5 μm. The coating formulations so applied were dried at 100° C. for 2 minutes, and then aged at 80° C. for 24 hours to obtain skin materials (sheets) provided with top coat layers, respectively. Those skin materials were then molded by a vacuum molding machine equipped with a convex mold controlled at 160° C. at a surface thereof, whereby molded products were obtained, respectively.

Evaluation

The molded products obtained as described above were ranked for moldability, gloss (luster), coefficient of friction, adhesiveness, scratch resistance, oil resistance, chemical resistance, surface abrasion resistance, and environmental responsiveness by the below-described methods and standards, and those molded products were evaluated. Especially, the surfaces (top coat layers) of the molded products formed of the respective sheets were evaluated. The results are shown in Table 7 and Table 8.

(Moldability)

The surface of each sheet after its vacuum molding was visually observed and ranked.

A: Good (No molding cracking or whitening phenomenon)
B: Bad (Either molding cracking or whitening phenomenon is observed)

(Gloss Value)

Following JIS K5600, the luster of the surface of each sheet after its vacuum molding was measured by a gloss meter. A gloss value of 1.2 or smaller (standard value required in the relevant business field) was set to pass.

(Coefficient of Friction)

The coefficient of friction of the surface of each sheet after its vacuum molding was measured by the surface property tester (manufacture by Shinto Scientific Co., Ltd.). A coefficient of friction of not higher than 0.2 was set to be desired, because a lower coefficient of friction leads to a smaller abnormal noise (squeak noise) by friction between the surfaces of vehicle interior trim materials.

(Adhesiveness)

On the surface of each sheet after its vacuum molding, a cross-cut cellophane tape peeling test was conducted. The adhesiveness of the sheet was ranked in accordance with the following standards.

A: Good (No peeled portion in the coated surface)
B: Bad (Peeled area at the coated surface)

(Scratch Resistance)

The surface of each sheet after its vacuum molding was rubbed with a nail. By visually observing whether or not a trace of scratch or whitening had occurred, the scratch resistance of the sheet was ranked in accordance with the following standards.

A: Good (Nail scratch or whitening is hardly noticeable at the coated surface)
B: Bad (Nail scratch or a trace of whitening is clearly noticeable at the coated surface)

(Oil Resistance)

The surface of each sheet after its vacuum molding was coated over an area of 2 cm in radius with beef tallow (Nacalai Tesque, Inc.), and the sheet so coated was left over for 5 days in an atmosphere of 80° C. Subsequently, the beef tallow was removed. On the area where the coated beef tallow had been removed, a cross-cut cellophane tape peeling test was conducted to rank the oil resistance of the sheet.

(Chemical Resistance)

Onto the surface of each sheet after its vacuum molding, ethanol was dropped. For allowing the surface to always remain in a wet state, the solvent was additionally dropped. One hour later, the solvent was wiped off. A portion of the sheet, where the dropped solvent had been wiped off, was visually observed, and the chemical resistance of the sheet was ranked in accordance with the following standards.

A: No trace of dropping was observed at all on the coated surface.
B: A slight trace of dropping was recognized, but it was not noticeable.
C: A clear trace of dropping was recognized.

(Surface Abrasion Resistance)

Using a plane abrasion tester, the surface of each sheet after its vacuum molding was rubbed by reciprocating No. 6 canvas under a load of 1 kgf. The number of reciprocations until occurrence of a scratch was counted. The surface abrasion resistance of the sheet was ranked in accordance with the following standards.

A: 5,000 reciprocations or more
B: 2,000 reciprocations or more, but less than 5,000 reciprocations
C: Less than 2,000 reciprocations (Environmental Responsiveness)

The environmental responsiveness of each skin material was ranked "A" or "B" depending on whether or not carbon dioxide was fixed in the resin used for the formation of the top coat layer of the skin material.

TABLE 7

Compositions of Coating Formulations for Skin Materials of the Examples and Ranking Results of Molded Products

| Examples | 16 | 17 | 18 | 19 | 20 | 21 |
|---|---|---|---|---|---|---|
| Primer | Chlorinated polypropylene | | | | | |
| Resin of Polymerization Example 1-1 (parts) | 100 | 100 | — | — | — | — |
| Resin of Polymerization Example 2-1 (parts) | — | — | 100 | 100 | — | — |
| Resin of Polymerization Example 3-1 (parts) | — | — | — | — | 100 | 100 |
| Matting agents Resin particles[a] (parts) | 35 | 25 | 35 | 25 | 35 | 25 |
| Silica[b] | — | 10 | — | 10 | — | 10 |
| Crosslinking agent[c] (parts) | 3 | 3 | 3 | 3 | 3 | 3 |
| Moldability | A | A | A | A | A | A |
| Gloss value | 0.9 | 0.7 | 0.9 | 0.7 | 1.0 | 0.9 |
| Coefficient of friction | 0.135 | 0.125 | 0.165 | 0.147 | 0.176 | 0.154 |
| Adhesiveness | A | A | A | A | A | A |
| Scratch resistance | A | A | A | A | A | A |
| Oil resistance | A | A | A | A | A | A |
| Chemical resistance | A | A | A | A | A | A |
| Surface abrasion resistance | A | A | A | A | A | A |
| Environmental responsiveness | A | A | A | A | A | A |

[a]"FINE POLYURETHANE PARTICLES" (product of Dainichiseika Color & Chemicals Mfg., Co., Ltd., 5 μm on average)
[b]"NIPSIL" (product of Nippon Silica Industry Co., Ltd.)
[c]"COLONATE HX" (product of Nippon Polyurethane Industry Co., Ltd.)

TABLE 8

Compositions of Coating Formulations for Skin Materials of the Comparative Examples and Ranking Results of Molded Products

| Comparative Examples | 17 | 18 | 19 | 20 | 21 | 22 |
|---|---|---|---|---|---|---|
| Primer | Chlorinated polypropylene | | | | | |
| Resin of Comp. Polymerization Ex. 1-1 (parts) | 100 | 100 | — | — | — | — |
| Resin of Comp. Polymerization Ex. 2-1 (parts) | — | — | 100 | 100 | — | — |
| Resin of Comp. Polymerization Ex. 3-1 (parts) | — | — | — | — | 100 | 100 |
| Matting agents Resin particles[a] (parts) | 35 | 25 | 35 | 25 | 35 | 25 |
| Silica[b] | — | 10 | — | 10 | — | 10 |
| Crosslinking agent[c] (parts) | 3 | 3 | 3 | 3 | 3 | 3 |
| Moldability | A | A | A | A | A | A |
| Gloss value | 0.9 | 0.7 | 1.5 | 1.3 | 1.0 | 0.9 |
| Coefficient of friction | 0.287 | 0.245 | 0.420 | 0.382 | 0.141 | 0.128 |
| Adhesiveness | A | A | A | B | A | A |
| Scratch resistance | A | A | B | B | A | A |
| Oil resistance | A | A | B | B | B | B |
| Chemical resistance | A | A | B | B | B | B |
| Surface abrasion resistance | A | A | C | C | A | A |
| Environmental responsiveness | A | A | B | B | B | B |

[a]"FINE POLYURETHANE PARTICLES" (product of Dainichiseika Color & Chemicals Mfg., Co., Ltd., 5 μm on average)
[b]"NIPSIL" (product of Nippon Silica Industry Co., Ltd.)
[c]"COLONATE HX" (product of Nippon Polyurethane Industry Co., Ltd.)

[Weather Strip Materials]

Examples 22 to 27 & Comparative Examples 23 to 26

(Used Polyurethane Resins)

In Examples 22 to 27, the polysiloxane-modified polyhydroxy polyurethane resins, which were obtained in Polymerization Examples 1-1, 2-1 and 3-1 and were used above for the production of imitation leathers, were used. In Comparative Examples 23 and 24, a similar polyester urethane resin solution as that used in Comparative Example 15 of the skin material made of the thermoplastic polyolefin resin was used.

In Comparative Examples 25 and 26, a similar polysiloxane-modified polyurethane resin solution as that used in Comparative Example 16 of the skin material made of the thermoplastic polyolefin resin was used. Separately using the polyurethane resins, coating formulations (resin compositions) were prepared in accordance with the corresponding compositions shown in Tables 9 and 10 to provide them as the weather strip materials of Examples 22 to 27 and Comparative Examples 23 to 26, respectively. Further, those coating formulations were applied by an air spray gun onto EPDM rubber sheets, followed by drying at 100° C. for 10 minutes to form films of 20 μm, respectively. The EPDM rubber sheets, which had been obtained as described above and had the films, were provided as measurement samples for the ranking of the surface treatment layers (films) formed by the respective weather strip materials.

Evaluation

The weather strip materials and measurement samples prepared as descried above were measured for coefficient of static friction, coefficient of kinetic friction, contact angle, adhesiveness, abrasion durability, weatherability and the like by the below-described methods, and the materials of the examples and comparative examples were ranked. Ranking results are collectively shown in Tables 9 and 10.

(Coefficient of static friction, coefficient of kinetic Friction)

The coefficient of static friction and coefficient of kinetic friction of each weather strip material (film) against a glass member were measured by using the surface property tester (manufacture by Shinto Scientific Co., Ltd.).

(Contact Angle)

The contact angle to water at the film portion of each measurement sample obtained as described above was measured by a contact angle meter (manufactured by Kyowa Interface Science Co., Ltd.), and was recorded as the contact angle of the film, which was formed of the corresponding weather strip material, to water.

(Adhesiveness)

On the film portion of each measurement sample obtained as described above, a cross-cut cellophane tape peeling test was conducted. The adhesiveness of the film formed of the corresponding weather strip material was ranked in accordance with the following standards.

A: Good (No peeled portion in the film)
B: Bad (Peeled area on the film)

(Abrasion Durability)

A glass plate was brought under a load of 9.8 N into contact with the film portion of each measurement sample obtained as described above, and the glass plate was reciprocated. The number of reciprocations until occurrence of a tear in the film was counted by the surface property tester (manufacture by Shinto Scientific Co., Ltd.). Based the number of the reciprocations so counted, the abrasion durability of the film formed of the corresponding weather strip material was ranked.

(Weatherability test)

Using a "SUNSHINE CARBON ARC WEATHER METER" (Suga Test Instruments Co., Ltd.), the film portion of each measurement sample obtained as described above was exposed to light at a panel temperature of 83° C. for 200 hours. The conditions of the film surface were then visually observed, and the weatherability of the surface of the film formed of the corresponding weather strip material was ranked in accordance with the following standards.

3: No changes in surface conditions
2: Some changes in surface conditions
1: Significant changes and whitening phenomenon (Environmental Responsiveness)

The environmental responsiveness of each weather strip material was ranked "A" or "B" depending on whether or not carbon dioxide was fixed in the weather strip material (film).

TABLE 9

Ranking Results of Examples

|  | Examples | | | | | |
| --- | --- | --- | --- | --- | --- | --- |
|  | 22 | 23 | 24 | 25 | 26 | 27 |
| Resin of Polymerization Example 1-1 (parts) | 100 | 100 | — | — | — | — |
| Resin of Polymerization Example 2-1 (parts) | — | — | 100 | 100 | — | — |
| Resin of Polymerization Example 3-1 (parts) | — | — | — | — | 100 | 100 |
| Matting agents  Resin particles[a] (parts) | — | 25 | — | 25 | — | 25 |
| Silica[b] | 10 | 10 | 10 | 10 | 10 | 10 |
| Silicone oil[c] (parts) | — | 20 | — | 20 | — | 20 |
| Crosslinking agent[d] (parts) | 3 | 3 | 3 | 3 | 3 | 3 |
| Coefficient of static friction | 0.33 | 0.28 | 0.38 | 0.30 | 0.35 | 0.27 |
| Coefficient of kinetic friction | 0.17 | 0.14 | 0.16 | 0.14 | 0.16 | 0.14 |
| Contact angle (°) | 109 | 112 | 110 | 112 | 112 | 113 |
| Adhesiveness | A | A | A | A | A | A |
| Abrasion durability (×$10^4$ reciprocations) | 14 | 16 | 13 | 15 | 13 | 15 |
| Weatherability test | 3 | 3 | 3 | 3 | 3 | 3 |
| Environmental responsiveness | A | A | A | A | A | A |

[a]"FINE POLYURETHANE PARTICLES" (product of Dainichiseika Color & Chemicals Mfg., Co., Ltd., average particle size: 5 μm)
[b]"NIPSIL" (product of Nippon Silica Industry Co., Ltd.)
[c]"KF96H" (product of Shin-Etsu Chemical Co., Ltd.)
[d]"COLONATE HX" (product of Nippon Polyurethane Industry Co., Ltd.)

TABLE 10

Ranking Results of Comparative Examples

|  | Comparative Examples | | | |
| --- | --- | --- | --- | --- |
|  | 23 | 24 | 25 | 26 |
| Resin of Comparative Polymerization Example 2-1 (parts) | 100 | 100 | — | — |
| Resin of Comparative Polymerization Example 3-1 (parts) | — | — | 100 | 100 |
| Matting agents (parts) Resin particles[a)] | — | 25 | — | 25 |
| Matting agents (parts) Silica[b)] | 10 | 10 | 10 | 10 |
| Silicone oil[c)] (parts) | — | 20 | — | 20 |
| Crosslinking agent[d)] (parts) | 3 | 3 | 3 | 3 |
| Coefficient of static friction | 0.65 | 0.58 | 0.35 | 0.27 |
| Coefficient of kinetic friction | 0.25 | 0.16 | 0.17 | 0.15 |
| Contact angle (°) | 86 | 110 | 112 | 113 |
| Adhesiveness | B | B | B | B |
| Abrasion durability (×10⁴ reciprocations) | 4 | 9 | 8 | 10 |
| Weatherability test | 1 | 1 | 2 | 2 |
| Environmental responsiveness | B | B | B | B |

[a)]"FINE POLYURETHANE PARTICLES" (product of Dainichiseika Color & Chemicals Mfg., Co., Ltd., average particle size: 5 μm)
[b)]"NIPSIL" (product of Nippon Silica Industry Co., Ltd.)
[c)]"KF96H" (product of Shin-Etsu Chemical Co., Ltd.)
[d)]"COLONATE HX" (product of Nippon Polyurethane Industry Co., Ltd.)

INDUSTRIAL APPLICABILITY

According to the present invention, there is provided a novel polysiloxane-modified polyhydroxy polyurethane resin, which is excellent in lubricity, abrasion resistance, chemical resistance, non-tackiness, antistatic properties, heat resistance and the like, can replace conventional fossil-based plastics, and is useful as film and molding materials, various coating materials, various binders, and so on. The resin provided by the present invention can use carbon dioxide as a production raw material, the present invention makes it possible to provide products which are responsive to the global environment and can contribute to a reduction in carbon dioxide as a greenhouse gas. The present invention, therefore, is also expected to find a wide variety of utility from this respect. This resin can be used, for example, in the below-described fields. The use of the resin according to the present invention makes it possible to obtain products, which are no way inferior to those obtained by using conventional fossil-based materials and are further added with new performance although they are products responsive to the global environment.

By forming a heat-resistant protective layer, which makes up a thermal recording medium, with the above-described resin of the present invention, the polysiloxane segments in the resin orient in a surface, thereby making it possible to provide the heat-resistant protective layer with heat resistance, slidability and non-tackiness to a thermal head, all of which the polysiloxane segments are equipped with. In addition, the hydroxyl groups which the polysiloxane-modified polyhydroxy polyurethane resin has strongly interact with a base material sheet at the interface between them, so that the heat-resistant protective layer is provided with excellent adhesiveness to the base material, superb flexibility, and outstanding antistatic effect. The thermal recording medium can, therefore, be obtained with the heat-resistant protective layer that shows excellent performance.

Owing to the use of a resin composition, which contains the resin of the present invention as a principal component, in the production of an imitation leather, the resulting imitation leather can be provided with excellent pliability, lubricity, scratch resistance, abrasion resistance and chemical resistance. In addition, the hydroxyl groups in the structure of the polysiloxane-modified polyhydroxy polyurethane resin strongly interact with a base fabric (base material sheet) at the interface between them. It is, therefore, possible to obtain outstanding performance that excellent adhesiveness to the base fabric, superb flexibility, and outstanding antistatic effect are imparted.

Owing to the use of a composition, which contains the polysiloxane-modified polyhydroxy polyurethane resin of the present invention, in a top coat layer of a thermoplastic polyolefin resin sheet which makes up a skin material made of the thermoplastic polyolefin resin and is useful as a vehicle interior trim material or the like, the polysiloxane segments in the resin orient in the surface so that a molded product obtained from the skin material is excellent in lubricity, surface touch feeling, scratch resistance, abrasion resistance and chemical resistance, and moreover, superb in uniform matting effect. In addition, the hydroxyl groups contained in the polysiloxane-modified polyhydroxy polyurethane resin, which forms the top coat layer, strongly interact with a base material sheet at the interface between them. It is, therefore, possible to obtain outstanding performance that excellent adhesiveness and flexibility are exhibited and antistatic effect is imparted.

By using as a weather strip material a resin composition that contains the polysiloxane-modified polyhydroxy polyurethane resin of the present invention, a film can be obtained with excellent lubricity, abrasion resistance, heat resistance, weatherability and uniform matting effect when the material is coated on or impregnated in a high molecular elastomer material (base material sheet). In addition, the hydroxyl groups in the polysiloxane-modified polyhydroxy polyurethane resin strongly interact with the base material sheet at the interface between them, so that a film of outstanding performance can be obtained with superb adhesiveness, flexibility and antistatic effect imparted thereto.

The invention claimed is:
1. A polysiloxane-modified polyhydroxy polyurethane resin characterized by being derived from a reaction between a 5-membered cyclic carbonate polysiloxane compound represented by following formula (1) and a primary diamine compound:

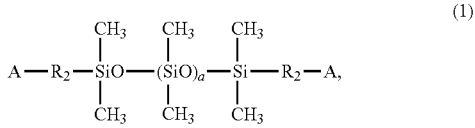

wherein A is

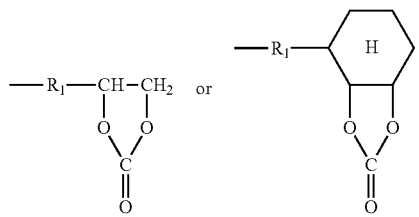

in which $R_1$ is an alkylene group that has from 1 to 12 carbon atoms and may have therein a linkage by an element selected from the group consisting of O, S, and N or a linkage by $-(C_2H_4O)_b-$ or both the linkages, $R_2$ is a direct bond or an alkylene group having from 2 to 20 carbon atoms, wherein $R_2$ may be linked to an alicyclic group or aromatic group, b stands for a number from 1 to 300, and a stands for a number from 1 to 300.

2. The polysiloxane-modified polyhydroxy polyurethane resin according to claim 1, wherein in the resin, the 5-membered cyclic carbonate polysiloxane compound is a reaction product of an epoxy-modified polysiloxane compound with carbon dioxide.

3. The polysiloxane-modified polyhydroxy polyurethane resin according to claim 2, which comprises carbon dioxide in an amount from 1 to 25 mass %, which is derived from a raw material.

4. The polysiloxane-modified polyhydroxy polyurethane resin according to claim 1, wherein a content of polysiloxane segments in a molecule of the resin is from 1 to 75 mass %.

5. The polysiloxane-modified polyhydroxy polyurethane resin according to claim 1, wherein the primary diamine compound is at least one diamine selected from the group consisting of aliphatic diamines, aromatic diamines, alicyclic diamines, and alkanoldiamines.

6. The polysiloxane-modified polyhydroxy polyurethane resin according to claim 1, wherein the primary diamine compound is at least one diamine selected from the group consisting of methylenediamine, ethylenediamine, trimethylenediamine, 1,3-diaminopropane, hexamethylenediamine, octamethylenediamine, phenylenediamine, 3,3'-dichloro-4,4'-diaminodiphenylmethane, 4,4'-methylenebis(phenylamine), 4,4'-diaminodiphenyl ether, 4,4'-diaminodiphenylsulfone, meta-xylylenediamine, para-xylylenediamine, 1,4-cyclohexanediamine, 4,4'-diaminocyclohexylmethane, 1,4'-diaminomethylcyclohexane, isophorone diamine, monoethanoldiamine, aminoethylethanolamine, hydroxyethylaminopropylamine, and bis-aminopropylpiperazine.

7. A polysiloxane-modified polyhydroxy polyurethane resin composition, which comprises the polysiloxane-modified polyhydroxy polyurethane resin according to claim 1 and a resin different from the polysiloxane-modified polyhydroxy polyurethane resin.

8. A polysiloxane-modified polyhydroxy polyurethane resin composition comprising:

the polysiloxane-modified polyhydroxy polyurethane resin according to claim 1; and a crosslinking agent that reacts with hydroxyl groups present in a structure of the polysiloxane-modified polyhydroxy polyurethane resin.

9. An imitation leather, comprising a base fabric; and a resin composition that comprises the polysiloxane-modified polyhydroxy polyurethane resin according to claim 1 as a principal component thereof, wherein the resin composition is impregnated in or laminated on the base fabric.

10. The imitation leather according to claim 9, wherein the resin composition further comprises a resin different from the polysiloxane-modified polyhydroxy polyurethane resin.

11. The imitation leather according to claim 9, wherein the polysiloxane-modified polyhydroxy polyurethane resin in the resin composition, which is impregnated in or laminated on the base fabric, has been crosslinked by a reaction between hydroxyl groups present in a structure of the resin and a crosslinking agent that reacts with the hydroxyl groups.

12. A skin material made of a thermoplastic polyolefin resin, comprising:

a thermoplastic polyolefin resin sheet; and a top coat layer formed directly or via a primer layer on the sheet, wherein the top coat layer comprises as a principal component thereof, the polysiloxane-modified polyhydroxy polyurethane resin according to claim 1.

13. The skin material according to claim 12, wherein the top coat layer has been formed with a resin composition that further comprises:

as a matting agent, a material comprising one fine powder or a combination of two or more fine powders, selected from the group consisting of organic fine powders and inorganic fine powders, wherein the material as the matting agent is added in a ratio from 1 to 150 parts by mass relative to 100 parts by mass of the polysiloxane-modified polyhydroxy polyurethane resin.

14. The skin material according to claim 12, wherein the top coat layer has been formed with a resin composition that further comprises a resin different from the polysiloxane-modified polyhydroxy polyurethane resin.

15. The skin material according to claim 12, wherein the top coat layer is a film in which hydroxyl groups present in a structure of the polysiloxane-modified polyhydroxy polyurethane resin and a crosslinking agent that reacts with the hydroxyl groups are crosslinked.

16. A weather strip material for coating and/or impregnating a high-molecular elastomer material and forming a surface treatment layer on a slide contact portion, which has a sliding contact with another part, comprising a resin composition that comprises the polysiloxane-modified polyhydroxy polyurethane resin according to claim 1.

17. The weather strip material according to claim 16, wherein the resin composition comprises:

the polysiloxane-modified polyhydroxy polyurethane resin; and at least one material selected from the group consisting of a diorganopolysiloxane, which has an average polymerization degree of from 5,000 to 100,000, and a silicone oil, which has a viscosity of from 100 to 1,000 cs, wherein the at least one material is added in a ratio from 1 to 100 parts by mass relative to 100 parts by mass of the polysiloxane-modified polyhydroxy polyurethane resin.

18. The weather strip material according to claim 16,
wherein the resin composition comprises, as a matting agent, a material -comprising one fine powder or a combination of two or more fine powders, selected from the group consisting of organic fine powders and inorganic fine powders, and
the material as the matting agent is added in a ratio from 1 to 150 parts by mass relative to 100 parts by mass of the polysiloxane-modified polyhydroxy polyurethane resin.

19. The weather strip material according to claim 16, wherein the resin composition further comprises a binder resin other than the polysiloxane-modified polyhydroxy polyurethane resin.

20. A weather strip comprising a high-molecular elastomer material; and the weather strip material according to claim 16,
wherein the weather strip material is present in at least one form selected from the group consisting of coating on and impregnating in the high-molecular elastomer material, and forms a surface treatment layer on a slide contact portion that has a sliding contact with another part, and
wherein the surface treatment layer is crosslinked with a crosslinking agent that reacts with hydroxyl groups in a structure of the polysiloxane-modified polyhydroxy polyurethane resin in the weather strip material.

21. A process for producing a polysiloxane-modified polyhydroxy polyurethane resin, which comprises:
reacting a 5-membered cyclic carbonate polysiloxane compound represented by following formula (1) and a primary diamine compound:

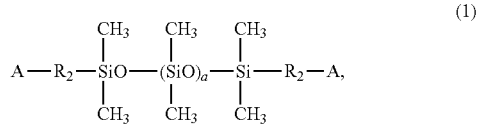
(1)

wherein A is

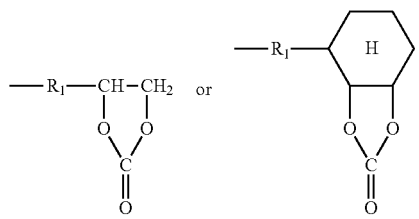

in which $R_1$ is an alkylene group that has from 1 to 12 carbon atoms and may have therein a linkage by an element selected from the group consisting of O, S, and N or a linkage by —$(C_2H_4O)_b$— or both the linkages,
$R_2$ is a direct bond or an alkylene group having from 2 to 20 carbon atoms, wherein $R_2$ may be linked to an alicyclic group or aromatic group,
b stands for a number of from 1 to 300, and
a stands for a number of from 1 to 300.

22. The process for producing a polysiloxane-modified polyhydroxy polyurethane resin according to claim 21, wherein the primary diamine compound is at least one diamine selected from the group consisting of aliphatic diamines, aromatic diamines, alicyclic diamines, and alkanoldiamines.

23. The process for producing a polysiloxane-modified polyhydroxy polyurethane resin according to claim 21, wherein the primary diamine compound is at least one diamine selected from the group consisting of methylenediamine, ethylenediamine, trimethylenediamine, 1,3-diaminopropane, hexamethylenediamine, octamethylenediamine, phenylenediamine, 3,3'-dichloro-4,4'-diaminodiphenylmethane, 4,4'-methylenebis(phenylamine), 4,4'-diaminodiphenyl ether, 4,4'-diaminodiphenylsulfone, meta-xylylenediamine, para-xylylenediamine, 1,4-cyclohexanediamine, 4,4'-diaminocyclohexylmethane, 1,4'-diaminomethylcyclohexane, isophorone diamine, monoethanoldiamine, aminoethylethanolamine, hydroxyethylaminopropylamine, and bis-aminopropylpiperazine.

24. The process according to claim 21, wherein as the 5-membered cyclic carbonate polysiloxane compound, a 5-membered cyclic carbonate polysiloxane compound is a reaction product of an epoxy-modified polysiloxane compound represented by following formula (2) with carbon dioxide is used:

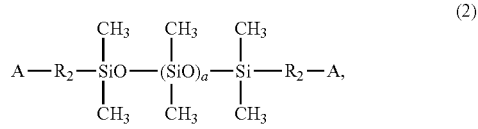
(2)

wherein A is

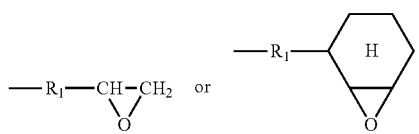

in which $R_1$ is an alkylene group that has from 1 to 12 carbon atoms and may have therein a linkage by an element selected from the group consisting of O, S, and N or a linkage by —$(C_2H_4O)_b$— or both the linkages,
$R_2$ is a direct bond or an alkylene group having from 2 to 20 carbon atoms, wherein $R_2$ may be linked to an alicyclic group or aromatic group,
b stands for a number of from 1 to 300, and
a stands for a number of from 1 to 300.

* * * * *